United States Patent [19]
Jones et al.

[11] Patent Number: 6,108,317
[45] Date of Patent: Aug. 22, 2000

[54] CYCLIC CODE PHASE MULTIPLE ACCESS FOR INBOUND SATELLITE COMMUNICATIONS

[75] Inventors: William W. Jones; James R. Luecke, both of Mission Viejo, Calif.

[73] Assignee: STM Wireless, Inc., Irvine, Calif.

[21] Appl. No.: 08/742,907

[22] Filed: Nov. 1, 1996

Related U.S. Application Data

[60] Provisional application No. 60/007,161, Nov. 1, 1995.

[51] Int. Cl.[7] .................................. H04J 13/02
[52] U.S. Cl. ..................... 370/320; 370/342; 375/208
[58] Field of Search .................... 370/203, 206, 370/208, 319, 320, 342, 441, 479; 375/208, 209, 210

[56] References Cited

U.S. PATENT DOCUMENTS

| | | | |
|---|---|---|---|
| 4,617,674 | 10/1986 | Mangulis et al. | 375/1 |
| 5,138,631 | 8/1992 | Taylor . | |
| 5,229,997 | 7/1993 | Hirata et al. . | |
| 5,235,615 | 8/1993 | Omura . | |
| 5,245,612 | 9/1993 | Kachi et al. . | |
| 5,307,341 | 4/1994 | Yates et al. . | |
| 5,327,455 | 7/1994 | De Gaudenzi et al. . | |
| 5,365,447 | 11/1994 | Dennis . | |
| 5,379,320 | 1/1995 | Fernandes et al. . | |
| 5,414,431 | 5/1995 | McCoskey . | |
| 5,440,597 | 8/1995 | Chung et al. . | |
| 5,537,397 | 7/1996 | Abramson . | |
| 5,592,506 | 1/1997 | Omura et al. | 375/207 |
| 5,768,269 | 6/1998 | Rakib et al. | 370/342 |

OTHER PUBLICATIONS

Scott L. Miller, "An Efficient Channel Coding Scheme for Direct Sequence CDMA Systems", MILCOM '91, IEEE, pp. 1249–1253, Sep. 1991.

F.A.B. Cercas et al., "Codes of Binary Length for LEO/MEO CDMA Systems", ICUPC '93, IEEE, pp. 349–353, Aug. 1993.

K.W. Yip et al., "Code Phase Assignment–A Technique for High–Capacity Indoor Mobile DS–CDMA Communications", IEEE, pp. 1586–1590, Mar. 1994.

(List continued on next page.)

*Primary Examiner*—Melvin Marcelo
*Attorney, Agent, or Firm*—Knobbe, Martens, Olson & Bear, LLP

[57] ABSTRACT

A satellite communication system comprising of a central hub/gateway station and remote very small aperture terminal (VSAT) stations. VSAT inbound transmissions are spread in bandwidth using an assigned PN code sequence. This sequence is derived as a cyclic function of a base sequence for use by the group of VSATs. The gateway transmits a continuous outbound signal that functions as the network frequency and timing reference. In addition, the gateway periodically forms timing and frequency error estimates on each VSAT transmission and broadcasts these results over the outbound channel to the VSATs. Use of the outbound reference coupled with these time and frequency measurements enable all VSAT inbound transmissions within a group to be bit synchronized. Bit level synchronization enable the system to gain the full advantage of the correlation properties of the cyclic codes to improve multiple access performance as compared to asynchronous or chip synchronous code division multiple access (CDMA) techniques. N active users can be supported with an N length code in this system even for small values of N (N≦15). The synchronized, cyclic relationship of the inbound transmissions enables the gateway to receive and demodulate a group of channels using a single receiver. The gateway station includes a correlator receiver which is synchronized with the gateways outbound network reference and which contains all the cyclic PN code sequences to detect correlations between the pseudo-randomly modulated data bits corresponding to the cyclic PN sequence bits of the VSAT stations.

13 Claims, 21 Drawing Sheets

OTHER PUBLICATIONS

DaSilva, V.M. and Sousa, E.S., "Multicarrier Orthogonal CDMA Signals for Quasi–Synchronous Communication Systems", IEEE Journal on Selected Areas in Communications, Vol. 12, No. 5, Jun. 1994, pp. 842–852.

Fitz, M.P., "Further Results in the Fast Estimation of a Single Frequency", IEEE Transactions on Communications, Vol. 42, No. 2/3/4, Feb./Mar./Apr. 1994, pp. 862–864.

De Gaudenzi, R., et al., "Orthogonal CDMA Transmission for Satellite–Based Mobile Communications Radio Networks", Proceedings of IEEE Globecom 1994, pp. 100–104.

De Gaudenzi, R., et al., "Bandlimited Quasi–Synchronous CDMA: A Novel Satellite Access Technique for Mobile and Personal Communication Systems", IEEE Journal on Selected Areas in Communications, vol. 10, No.2, Feb. 1992, pp. 328–343.

Holmes, J.K., "Coherent Spread Spectrum Systems (Chapter 12)", John–Wiley, 1990, pp. 614–616.

Jones, W.W. and Lofquist, D.B., "Joint Time and Frequency Estimation in TDMA Burst Receivers Using the Generalized Semicoherent Statistic", IEEE Military Comm. Conf., San Diego, CA, Nov. 5–8, 1995, pp. 793–797.

Kay, S., "A Fast and Accurate Single Frequency Estimator", IEEE Transactions on Acoustic, Speech and Signal Processing, vol. 37, No. 12, pp. 1987–1990, Dec. 1989.

Lank, G., et al., "A Semicoherent Detection and Doppler Estimation Statistic", IEEE Transactions on Aerospace and Electronic Systems, vol. AES–9, No. 2, pp. 151–165, Mar. 1973.

Shah, B. and Hinedi, S., "The Split Symbol Moments SNR Estimator in Narrow–Band Channels", IEEE Transactions on Aerospace and Electronic Systems, vol. AES26, No. 5, Sep. 1990, pp. 737–747.

Simon, M.K., et al., "Spread Spectrum Communications Handbook", McGraw–Hill, Inc., 1994, pp. 1103–1108, 1180–1184.

Abramson, Norman, "Multiple Access in Wireless Digital Networks", Proceedings of the IEEE, vol. 82, No. 9, Sep. 1994, pp. 1360–1370.

Abramson, Norman, "VSAT Data Networks", Proceedings of the IEEE, vol. 78, No. 7, Jul. 1990, pp. 1267–1274.

Simon, M.K., et al., "Digital Communication Techniques: Signal Design and Detection", PTR Prentice Hall, Englewood Cliffs, NJ, pp. 461–466.

FIG. 4A1

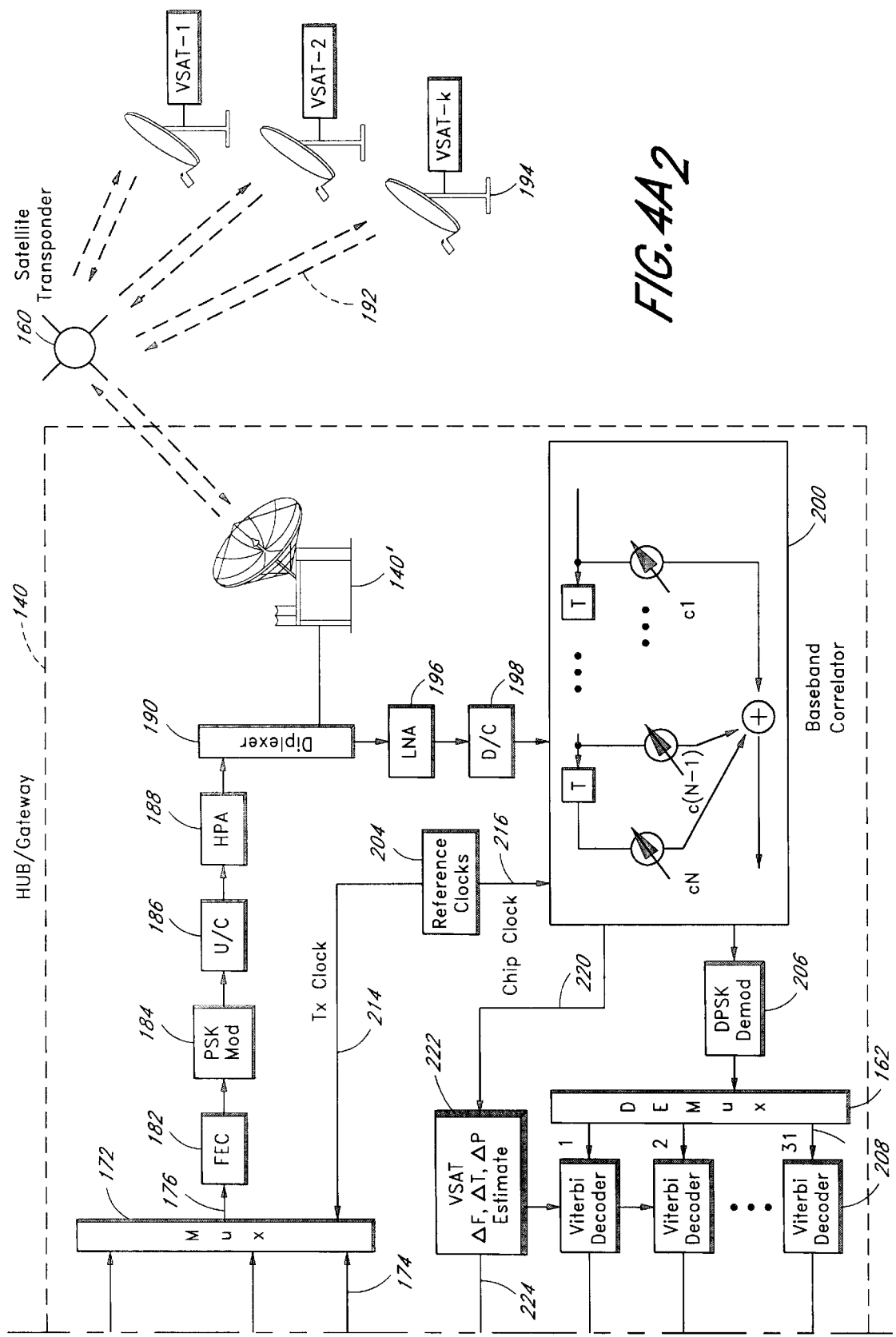
FIG. 4A2

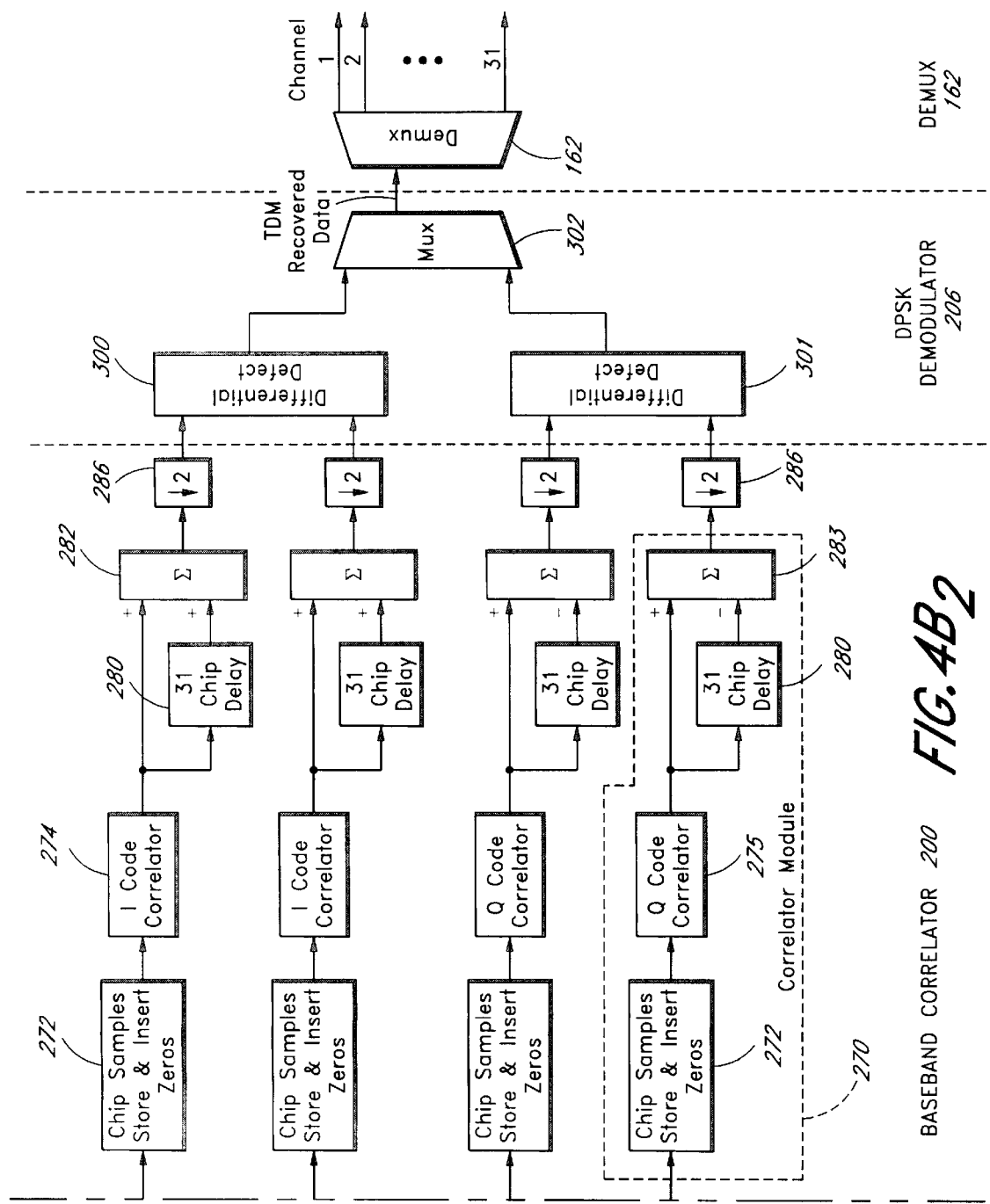
FIG. 4B2

FIG.4C₁

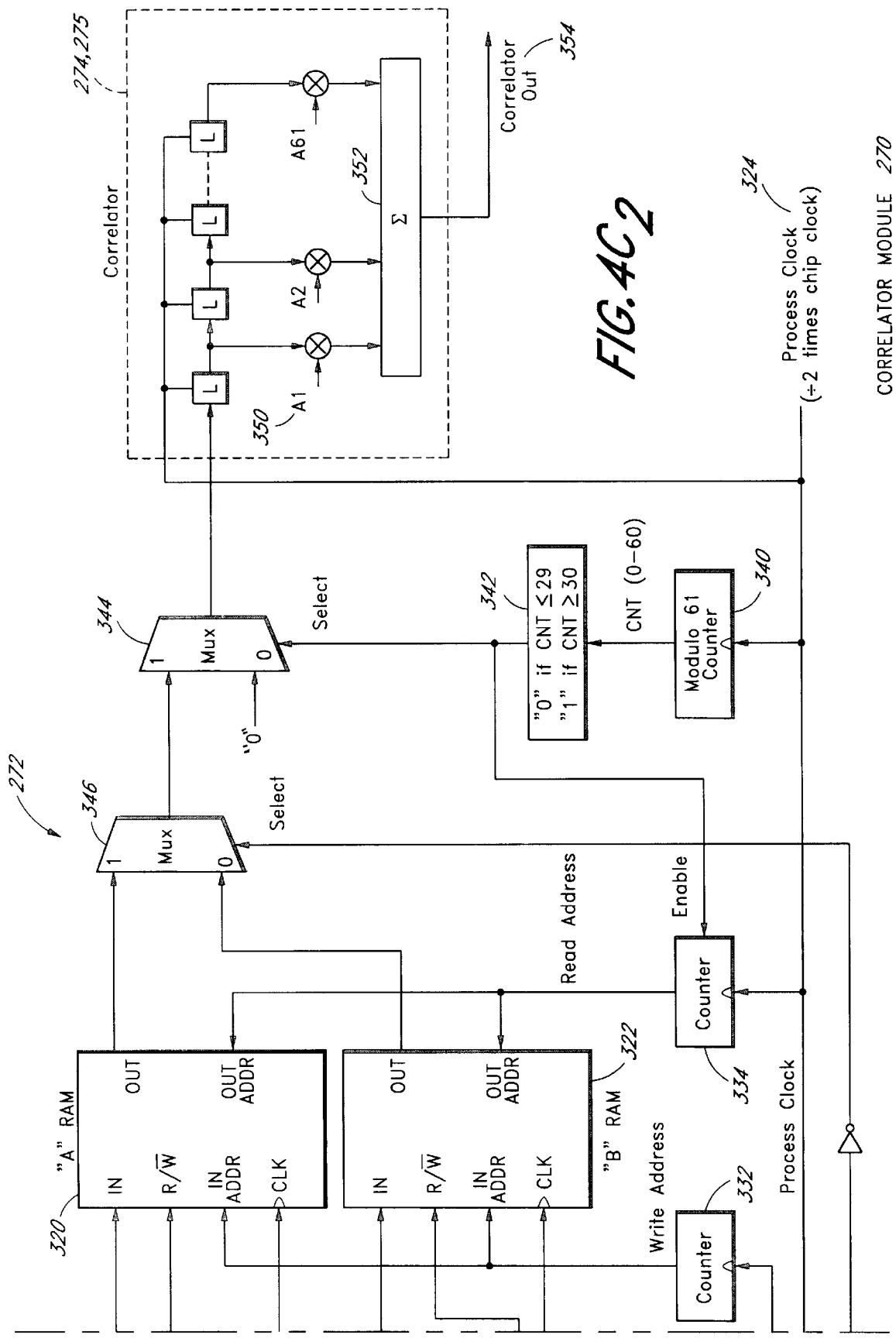
FIG.4C2

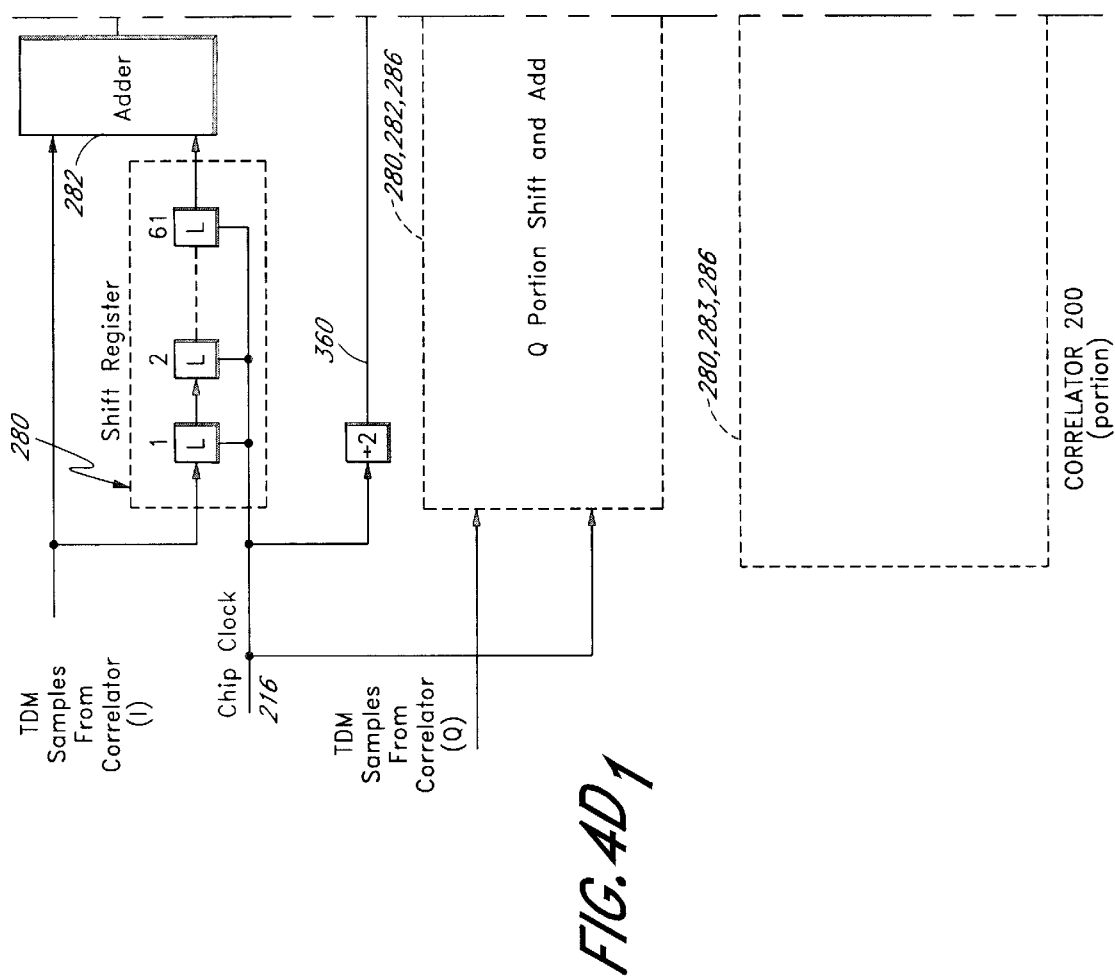
FIG.4D1
FIG.4D  FIG.4D1 FIG.4D2

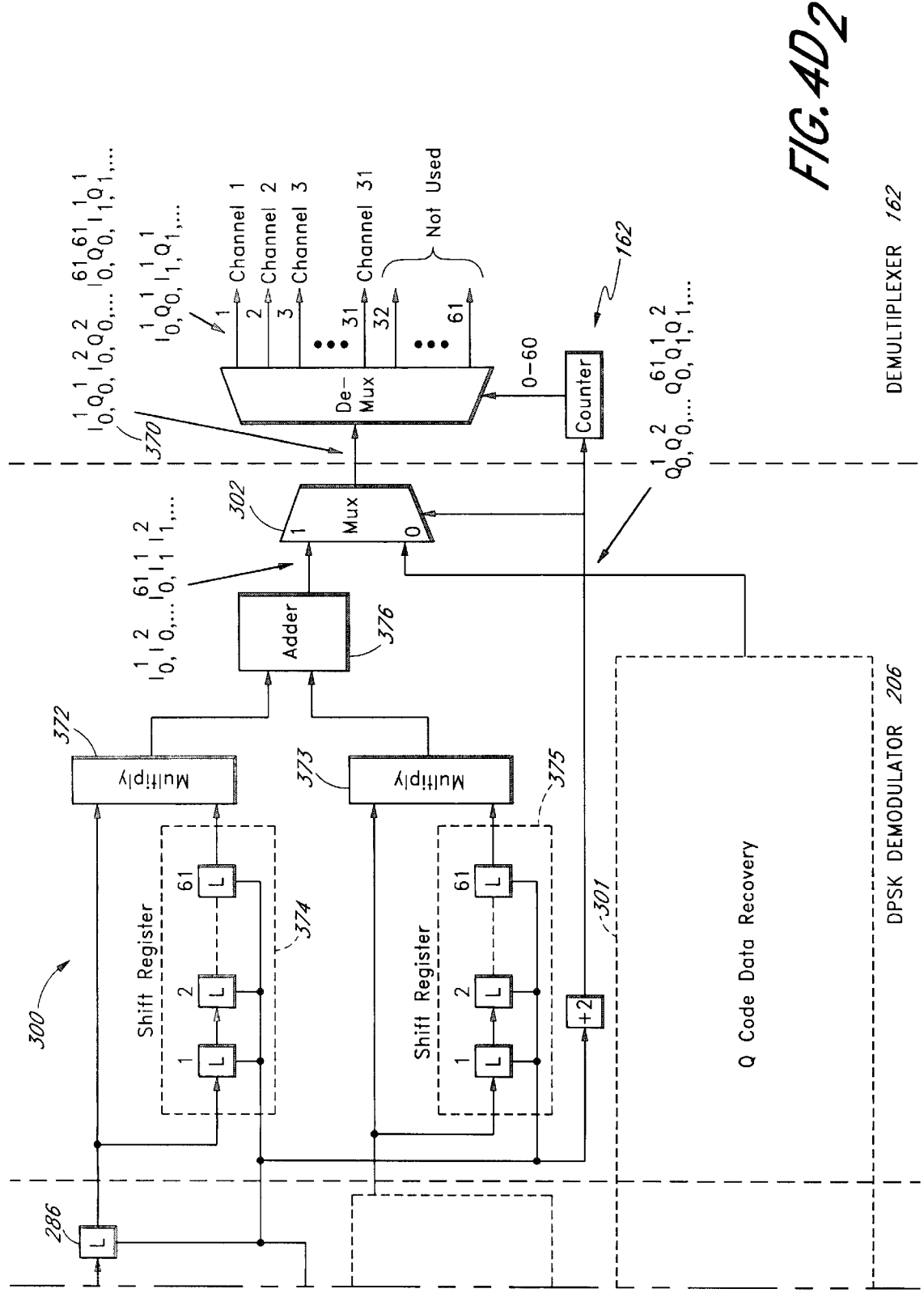

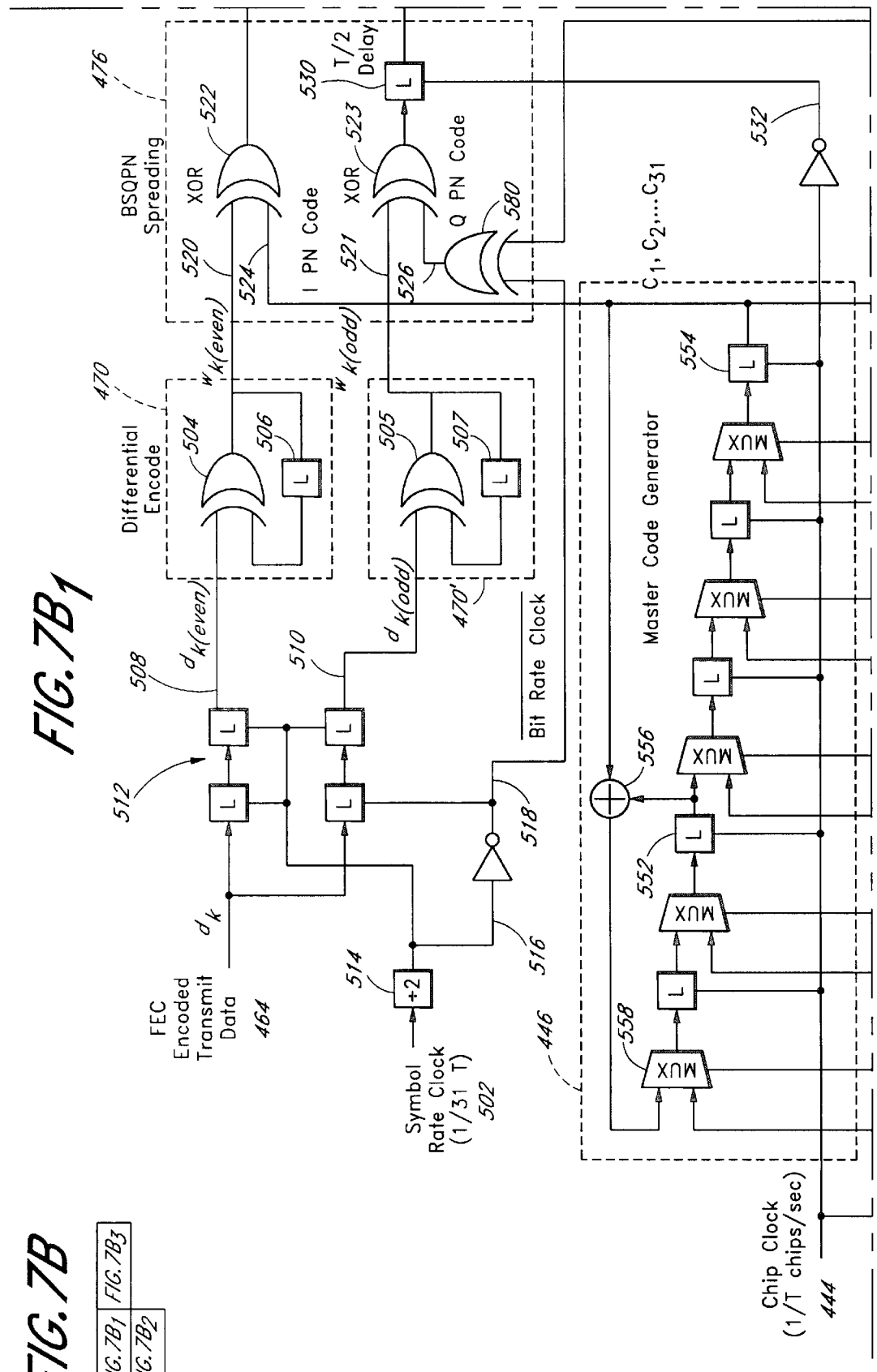

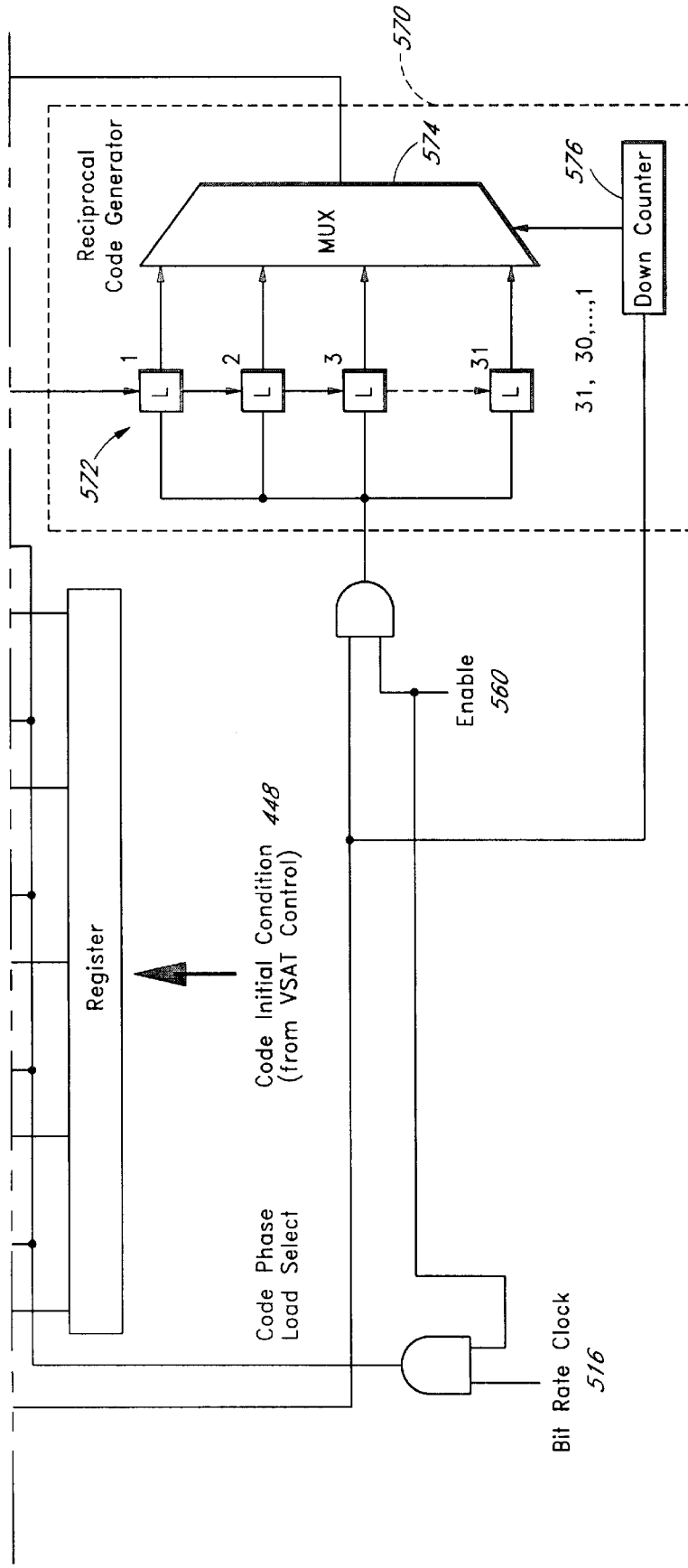
FIG. 7B2

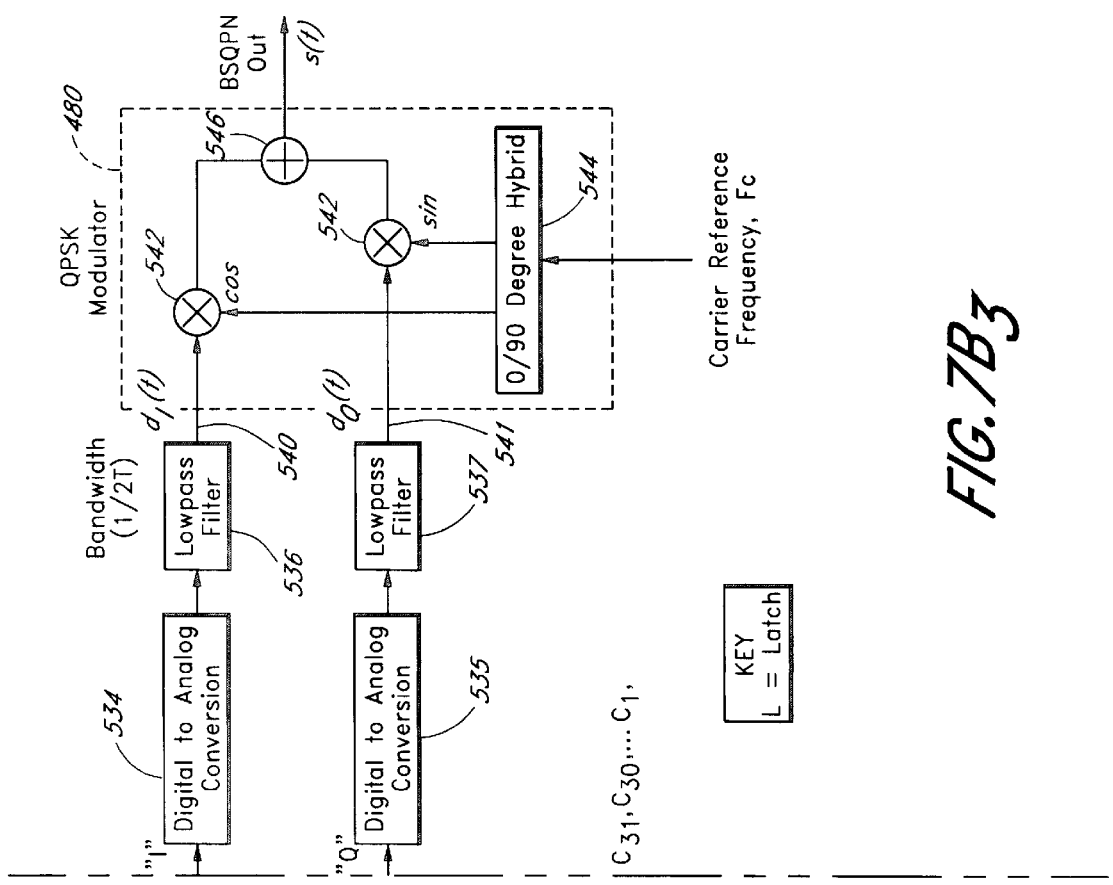
FIG.7B3

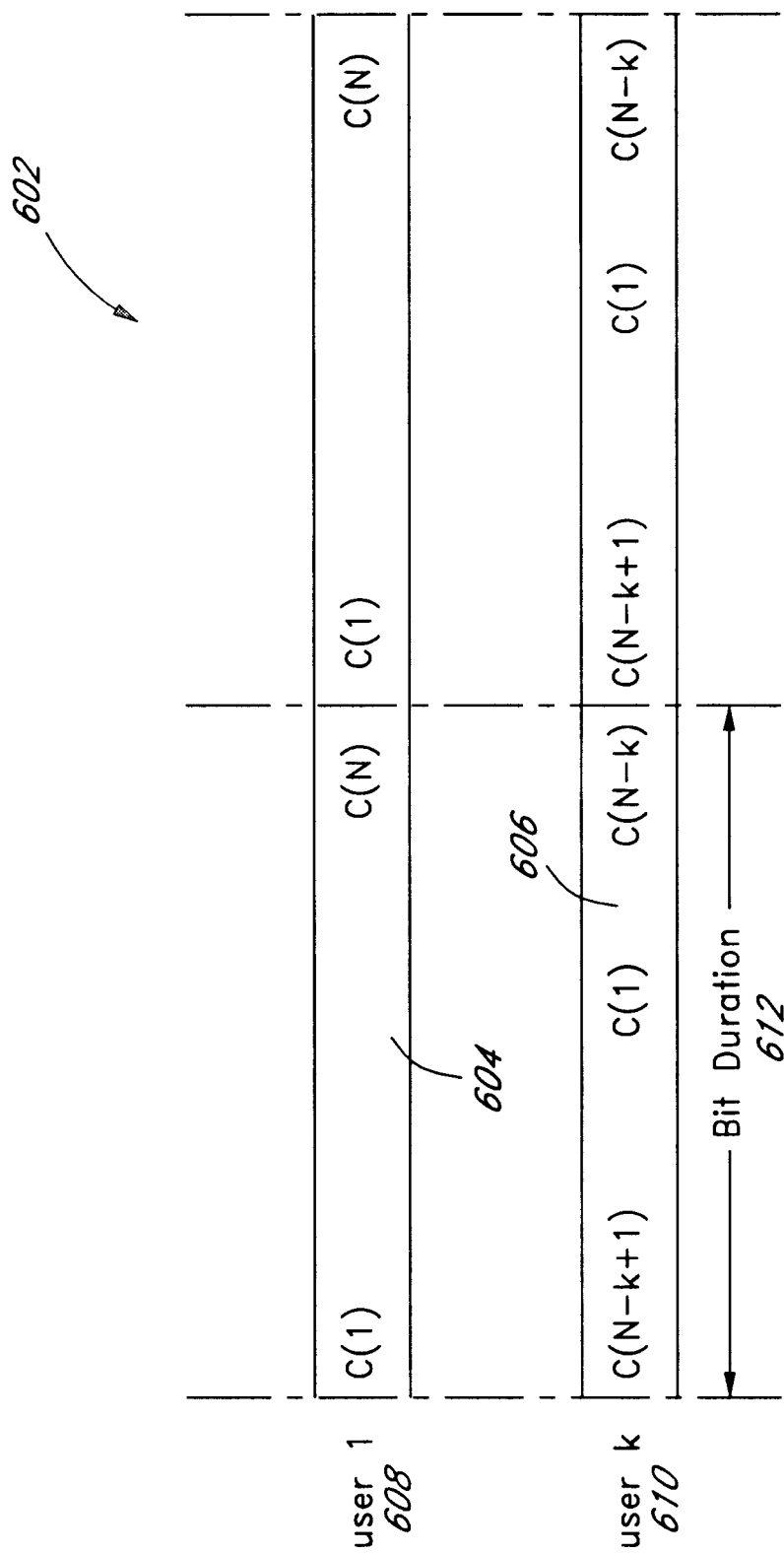

FIG. 10

| SHIFT | | CORRELATOR TAPS | | | | | | | USER # DESPREAD |
|---|---|---|---|---|---|---|---|---|---|
| | | 640' | 632' | | | 633' | 641' | | |
| 650 → 0 | 0 0 0 | C(1) | C(2) | C(3) | C(4) | C(1) | C(2) | C(3) | 1 |
| 652 → 1 | 0 0 0 | R(1) | R(2) | R(3) | R(4) | 0 | 0 | 0 | 2 |
| 654 → 2 | 0 0 0 | 0 | R(1) | R(2) | R(3) | R(4) | 0 | 0 | 3 |
| 656 → 3 | | 0 | 0 | R(1) | R(2) | R(3) | R(4) | 0 | 4 |
| 658 → 4-6 | | | | | FLUSH | | | | N/A |

642' · SHIFT REGISTER CONTENTS

CYCLIC CODE PHASE MULTIPLE ACCESS FOR INBOUND SATELLITE COMMUNICATIONS

This application claims the benefit of U.S. Provisional Application No. 60/007,161 filed on Nov. 1, 1995.

BACKGROUND OF THE INVENTION

1. Field of the Invention

The present invention relates to satellite communications systems that provide low-cost, over the satellite telephony connections to rural and other previously non-served areas. Communication is supported through existing, non-processing satellites to connect very small aperture terminal (VSAT) stations at remote sites to gateway terminals for connection to the public switched telephone network (PSTN).

2. Description of the Related Technology

There is a need to provide quality communication services to many groups of service users that are classified as remote (rural and suburban), primarily in emerging countries that are lacking a solid telecommunications infrastructure. In these emerging or developing countries there is insufficient telecommunications infrastructure to large portions of the population plus, where infrastructure does exist, it inadequately services the attendant population. These telecommunication services include voice (telephony), facsimile and data communications. These telecommunications services can be readily supplied through the use of satellite repeaters to relay digitized telephony signals from a large number of remote terminals/subscribers to one or more gateway terminals for interconnection to the public switched telephone network (PSTN).

Traditionally, communications between a satellite terminal, such as a VSAT, and a hub within a satellite-based network of the type addressed by this invention are performed in a TDM/TDMA (Time Division Multiplex/Time Division Multiple Access) or TDM/CDMA (Code Division Multiple Access) manner, where the outbound channel from the hub to the VSAT is operated as TDM, while the inbound channel can be TDMA or CDMA. TDMA requires higher transmission rates and more VSAT transmit power and is not a cost-effective solution for rural telephony applications. CDMA, on the other hand, uses spread-spectrum techniques to enable multiple VSATs to share a common bandwidth while reducing the VSATs transmit power level requirements. The inbound channel (VSAT to hub) is normally operated with the VSATs transmitting asynchronously, where the individual VSAT signals can arrive at the hub non-time aligned. When the channels are operated non-time aligned, the full cross-correlation properties of the codes are diminished such that (1) a long code is required (which corresponds to a larger transmission bandwidth) and (2) the number of terminals that can access the bandwidth is reduced because of the amount of multiple access interference. As such, CDMA is less efficient in terms of bandwidth for the fixed satellite channel application than other multiple access techniques such as TDMA or Frequency Division Multiple Access (FDMA). A special class of CDMA, referred to as synchronous CDMA, offers improved bandwidth efficiency by aligning the received symbols at the receiver. When the symbols are aligned, the cross-correlation benefits of the codes can be better realized such that shorter codes may be employed and more terminals can access the given bandwidth. In practice, these codes are normally selected from a family of codes known as Gold codes, due to the good cross-correlation properties exhibited by this code set, where a unique code is assigned to each VSAT. While this technique offers good multiple access performance, a bank of receivers are required at the hub to demodulate the inbound transmissions, where each receiver is matched to one of the assigned pseudo-noise or pseudo-random (PN) codes.

The prior art is replete with techniques for providing multiple users with access to a common communication channel. Division by time (TDMA) or frequency (FDMA) are common methods. These techniques generally provide perfect separation among users and therefore provide close to 100% network efficiency. Another technique obtains division by a pseudo random code. A variant of this method is CDMA where each user is assigned a unique code sequence as described by A. J. Viterbi, *CDMA: Principles of Spread Spectrum Communication*, Addison Wesley, 1995. Collectively, the different codes are sufficiently different, or orthogonal, such that a receiver matches to and only receives transmissions associated with its code of interest. Transmissions associated with other codes are rejected. This can only occur exactly when the users are mutually synchronized and their codes are perfectly orthogonal.

In digital, spread-spectrum communication, each information bit, obtained from a digital source and taking on the binary numbers of either 0 or 1, is transformed into a sequence of N binary numbers, where N is an integer. This transformation is called spreading. Specifically, let $c_1 \ldots c_N$ be the sequence of binary numbers having some desirable correlation property and let $d_k$ be an information bit. The N binary numbers resulting from this transformation are obtained by the Exclusive-Or of $d_k$ with each $c_1 \ldots c_N$. Each individual binary number $c_j$ is called a chip and collectively they are called a spreading code or simply the code. Since there are N chips/bit and denoting the duration of a bit as $T_b$ then the duration of a chip is $T_c=T_b/N$. Since the baud interval of the transmitted signal has been reduced by a factor of N, the corresponding transmitted waveform has a bandwidth expansion of N, hence, the term spreading. During the process of modulation, the logical values of 0 and 1 are mapped to the real numbers +1 and -1.

When considering multiple access systems which employ spread spectrum, the notion of synchronization between the users is of fundamental importance. There are three ways to define the relative synchronous relation between users. First is asynchronous, which implies no relative timing relationship among the users. Secondly, there is chip synchronization, wherein the chip boundaries of duration $T_c$ align exactly. The information bits of the two users are not in alignment. Thus, chip synchronous does not imply bit synchronous. This leads to the third defining relationship which is bit synchronous. Here, the information bits of each user operating in the multiple access system are in alignment. In particular, the boundaries of duration $T_b$ defining the bit duration for each user align exactly. An example in this case is given in FIG. 1. Clearly, bit synchronism includes chip synchronism.

FIG. 1 illustrates the synchronous relationship between spread transmissions 102 of different users, e.g., user 1 (104) and user k (106), where each user has a different spreading sequence 108 denoted $C_k(1) \ldots C_k(N)$ for the $k^{th}$ user. If synchronous conditions do not exist, then multiple access interference (MAI) results which degrades communication performance. MAI can be mitigated by increasing the length of the code sequence. Of the two effects, synchronization plays the dominant role with regard to MAI. In particular, asynchronous operation even with perfectly orthogonal codes incurs substantial interference losses. When synchronous, a system can still perform well even with small levels of cross correlation. The requirement that each user possess a unique code presents additional difficulties. The network is generally required to support a modest number of users. Hence, existence of large families of codes with minimum cross correlation is essential. Additionally, unique codes greatly increase the complexity at a hub or gateway where transmissions are being received from a large number of users. In this situation, the hub must possess separate receivers for each active user.

A technique which circumvents this complexity issue is spread slotted ALOHA as described by M. K. Simon, J. K. Omura, R. A. Scholtz & B. K. Levitt, *Spread Spectrum Communications Vol. III,* Computer Science Press, 1985, and by N. Abramson, "VSAT data networks," *Proc. IEEE,* vol. 78, no. 7, pp. 1267–1274, July 1990. FIG. 2 illustrates the (chip) synchronous relationship 110 between the users, e.g., user 1 (112) and user k (114). With N chips/bit, the users can be chip synchronous when any of the N chips of one user align with any of the N chips of another user. In FIG. 2, the first chip of user k (114) is aligned with the $k^{th}$ chip of another user 112. It is clear from this figure that the information bits of the two users are not in alignment. Here, each user is chip synchronous but not bit synchronous. Also, each user employs the same spreading sequence C(1) . . . C(N) 118. The sequence 118 is chosen such that the sidelobes in its autocorrelation function are minimal. Multiple access can then be obtained by restricting the relative transmission times between users to be an integer multiple 116 of a chip time. Note in particular that each user is utilizing the same spreading sequence 118 and that their transmissions are not bit aligned. Since each user has the same spreading sequence 118, the reduction in complexity is due to the elimination of multiple matched correlators. In particular, at a hub or gateway, a single correlator receiver can demodulate multiple user transmissions since the detected information from each user appears at the correlator output separated in time by the relative transmission time.

MAI occurs because of the autocorrelation sidelobes. The MAI is compounded since the users are not bit synchronous. In particular, the sidelobe levels of the autocorrelation function do not completely describe the MAI with this technique. The actual sidelobe level in the transmitted signal also depends on the user's bit patterns. Referring to FIG. 2, one bit duration from user 1 will generally overlap with two bits of any other user. For example, a first bit (not shown) for user k (114) ends at a time 117 and a new bit 119 begins, such that a latter portion of the first bit and the beginning portion of the new bit 119 for user k overlaps bit 113 of user 1 (112). So when another user incurs a bit transition, the sidelobe levels increase, causing interference for user 1. Consequently, the code sequence chosen in this approach must have sufficient length to mitigate a moderate level of MAI. In contrast to synchronous CDMA, spread slotted ALOHA will not be able to support N active users with an N length code sequence.

U.S. Pat. No. 5,537,397 to Abramson introduces a spread slotted ALOHA technique whereby each VSAT uses the same PN sequence for inbound transmissions to reduce the complexity of the hub. With a single PN sequence, only a single correlator based receiver is necessary at the hub to despread all VSAT transmissions. This system operates with all transmissions synchronized at the chip level. Being non-bit synchronous, data polarity on the individual VSAT transmissions affects the overall multiple access interference level and thereby reduces the multiple access efficiency. For slotted ALOHA applications, where the theoretical throughput capacity is 36.8%, the multiple access capability of this technique is sufficient. Alternative techniques are necessary for demand assigned voice applications, as related to this invention, where 100% utilization is required.

What is needed is a new modulation format for inbound communications between a group of remote VSATs and a centralized hub by means of a non-processing satellite, wherein a new form of CDMA is employed such that the VSAT transmissions are spread using sequences that are assigned from a set of cyclicly related PN sequences. When operated in a bit synchronous fashion, the full cross-correlation benefits of the codes would be maintained for best multiple access performance, while the cyclic relationship between the independent sequences would enable simplification of the gateway receiver implementation.

What is desired is a spread communication system that provides cost effective telephony services to remote and rural subscribers. Cost effective operation implies (1) low cost VSAT equipment, (2) efficient use of satellite resources, and (3) low cost hub equipment.

It would be an advance in VSAT communications to achieve spread-spectrum inbound communication that has little interference between users, for good multiple access performance and best use of available satellite resources, that operates with a low flux density to enable use of small, low cost antenna systems at the VSAT, and that has a waveform structure that inherently reduces the cost of the hub/gateway equipment.

SUMMARY OF THE INVENTION

The present invention is directed to a system and method for satellite based telephony transmission that provides full duplex, transparent communications to remote sites by transmitting a cyclic code phase multiple access spread-spectrum communications signal between a satellite terminal, or remote VSAT, and a hub, or gateway station. The gateway forms time, frequency and amplitude error measurements on all inbound VSAT transmissions with the results broadcast back to the VSATs to aid in alignment of their individual inbound transmissions. All VSATs transmissions are synchronized at the bit level to provide best multiple access performance while also reducing the hub processing complexity. With this invention, a new form of code division multiple access (CDMA) is employed wherein the VSAT transmissions are spread using sequences that are assigned from a set of cyclicly related PN sequences. This technique is referred to as Cyclic Code Phase Multiple Access (CCPMA). The cost issues are effectively dealt with by utilizing the inbound CCPMA modulation.

Full duplex communications between a gateway station and a plurality of remote VSATs is supported in the system through a set of channel groups. In the preferred embodiment, each channel group corresponds to the equivalent voice capacity of a full duplex E1 trunk circuit (30 full duplex voice channels at Signal Level 1 (Europe)). Dependent on the size of the network and number of subscribers to be supported, one or more channel groups may be supported at a gateway. Each channel group represents a block of shared bandwidth accessed with the CCPMA spread-spectrum modulation technique of this invention for inbound communications between the VSAT and gateway, and an outbound time division multiplexed (TDM) carrier for communications between the gateway and VSATs. There is a one-to-one association between inbound groups and each TDM outbound channel. In the preferred embodiment, with 30 inbound voice channels plus one inbound control channel, the CCPMA PN sequence length is 31 chips, while the outbound carrier is operated in a time division multiplexed fashion where 30 voice channels plus a control channel are multiplexed onto a single carrier. In the preferred embodiment, with 4800 bps voice channels, 480 kHz of total effective bandwidth is required to support a full duplex 30 channel group for more than 2250 full duplex channels per 36 MHz transponder.

The present invention includes a gateway or hub station that provides access to the public telephone network. The interface to the public network is via a digital E1 circuit. The gateway/hub is responsible for maintaining overall network synchronization. The gateway includes a network reference used to generate the outbound signal from the gateway to the VSATs. This signal is used by the VSAT as a timing reference for the generation of the inbound PN chip rate clock. The gateway also aids the VSATs in maintaining bit level synchronization between the VSAT transmissions as received at the gateway receiver. The gateway periodically estimates the timing, frequency and transmit power errors of each VSAT compared to the network nominal values and transmits these measurements back to the respective VSATs. Synchronization is maintained by implementing the prescribed corrections. Additionally, the gateway includes all the necessary hardware to receive one or more inbound channel groups. The CCPMA technique as described in this invention enables the gateway to receive and despread all transmissions associated with a channel group using a single baseband correlator receiver to greatly reduce the cost of the hub equipment.

The VSAT in the present invention is used to provide a direct 2-wire subscriber line access to a subscriber's phone, FAX or other telephony equipment. The VSAT receives the outbound transmission from the gateway and recovers its voice channel assignment. Using the TDM channel as a reference, the VSAT generates the clocks necessary to generate the inbound CCPMA signal.

In one aspect of the present invention, there is a satellite communications system, comprising a hub; and a plurality of satellite terminals (STs), wherein each ST communicates with the hub using a bit synchronous, spread spectrum multiple access protocol, each ST assigned a unique code sequence cyclically related to the other code sequences.

In another aspect of the present invention, there is, in a satellite communications system, a synchronous satellite terminal (ST) for receiving outbound communication signals from a hub and for transmitting inbound communication signals to the hub, the ST comprising a chip rate clock generator that recovers a bit timing clock signal received by the satellite terminal and generates a chip rate clock signal; a pseudo-noise (PN) code generator that receives the chip rate clock signal and a bit rate clock signal, and generates a cyclic shift inphase (I) PN code sequence and a cyclic shift quadrature (Q) PN code sequence; a differential encoder that differentially encodes data; a spreader that utilizes the I and Q PN code sequences to spread the encoded data; and a phase-shift keying modulator that receives the spread data and modulates a carrier with the spread data for transmission to the hub.

In another aspect of the present invention, there is a satellite communications system, including a cyclic correlator for receiving an inbound communication signal from a plurality of satellite terminals, the inbound communication signal comprising a serial stream of spread spectrum symbols comprising a delay line comprising 2N-1 storage elements, wherein N is a length in chips of a maximal length sequence code utilized for despreading the received symbols from the inbound communication signal; a set of 2N-1 multipliers receiving data from the delay line elements, wherein each delay line element feeds a corresponding multiplier, and wherein each multiplier has a tap and the taps of the multipliers are respectively set to different values (+1 and −1) corresponding to a cyclic pattern with which the symbols of the received communication signals from the satellite terminals have been spread; and an adder for summing the outputs of the multipliers thereby providing a set of data samples associated with symbols communicated from one of the satellite terminals.

In another aspect of the present invention, there is, in a satellite communications hub including a bit synchronous cyclic correlator utilizing a maximal length sequence (MLS) code, a method of correlating each signal communicated from a plurality of satellite terminals (STs) received as a spread spectrum inbound signal, comprising the steps of: (a) initializing a set of 2N-1 taps in the 2N-1 length correlator by: setting the first N taps to the chips associated with a selected MLS code sequence; and setting the remaining N-1 taps to the first N-1 chips of the selected code sequence; (b) inserting N-1 zeros between each group of N chips associated with a particular symbol of the received inbound signal; (c) loading all signal samples for the symbol into the correlator; (d) obtaining a first correlator output corresponding to the ST assigned to the code sequence representing a zero cyclic shift, thereby despreading the symbol; (e) shifting the samples and inserted zeros in the correlator by one position such that the only taps operating on non-zero samples correspond to the chips, in the shifted code sequence associated with the current cyclic shift; (f) obtaining a current correlator output corresponding to the ST assigned to the shift code sequence associated with the current cyclic shift; and (g) repeating steps (e) and (f) for N-1 shifts so that the symbol for each ST is despread from the received inbound signal.

In another aspect of the present invention, there is a method of satellite communication, comprising the steps of spreading satellite terminal using a code sequence assigned from a set of cyclicly related pseudo-noise (PN) sequences; and transmitting the cyclic code phase multiple access spread-spectrum communications signal.

In another aspect of the present invention, there is a communications signal, comprising a binary staggered quadrature pseudo-noise (BSQPN) waveform.

In yet another aspect of the present invention, there is, in a satellite communications system including a plurality of satellite terminals, an inbound communication signal including a serial stream of spread spectrum symbols generated by the satellite terminals, comprising a waveform comprising two sections of a data interval for a data symbol, a first section of the data interval having the equation:

$$x_1(t) = \frac{a_k}{2}c_i(t)\cos\theta - \frac{b_k}{2}c_q(t)\sin\theta + j\left(\frac{a_k}{2}c_i(t)\sin\theta + \frac{b_k}{2}c_q(t)\cos\theta\right)$$

and a second section of the data interval having the equation:

$$x_2(t) = \frac{a_k}{2}c_i(t)\cos\theta - \frac{b_k}{2}\overline{c}_q(t)\sin\theta + j\left(\frac{a_k}{2}c_i(t)\sin\theta + \frac{b_k}{2}\overline{c}_q(t)\cos\theta\right)$$

where overbar denotes polarity inversion of individual chips used in spreading the symbols, where the sequences $\{a_k\}$ and $\{b_k\}$ are differentially encoded inphase and quadrature data sequences, respectively, and where $c_i(t)$ and $c_q(t)$ are quadrature pseudo-noise spreading sequences.

In another aspect of the present invention, there is, in a satellite communications system including a plurality of satellite terminals, a correlated inphase signal derived from an inbound communication signal including a serial stream of spread spectrum symbols generated by the satellite terminals, comprising a first waveform portion correlated by a quadrature pseudo-noise (QPN) spreading sequence, $c_i(t)$, the first waveform portion having the equation:

$$y_1^i(t) = N\frac{a_k}{2}\cos\theta - \frac{b_k}{2}r_{iq}\sin\theta + j\left(N\frac{a_k}{2}\sin\theta + \frac{b_k}{2}r_{iq}\cos\theta\right)$$

where
$N = \int c_i^2(t)dt$ and $r_{iq} = \int c_i(t)c_q(t)dt$; and a second waveform portion correlated by the QPN spreading sequence, $c_i(t)$, the second waveform having the equation:

$$y_2^i(t) = N\frac{a_k}{2}\cos\theta - \frac{b_k}{2}\bar{r}_{iq}\sin\theta + j\left(N\frac{a_k}{2}\sin\theta + \frac{b_k}{2}\bar{r}_{iq}\cos\theta\right)$$

where $\bar{r}_{iq} = \int c_i(t)\bar{c}_q(t)dt = -r_{iq}$.

In another aspect of the present invention, there is, in a satellite communications system including a plurality of satellite terminals, a correlated quadrature signal derived from an inbound communication signal including a serial stream of spread spectrum symbols generated by the satellite terminals, comprising a first waveform portion correlated by a quadrature pseudo-noise (QPN) spreading sequence, $c_q(t)$, the first waveform portion having the equation:

$$y_1^q(t) = \frac{a_k}{2}r_{iq}\cos\theta - N\frac{b_k}{2}\sin\theta + j\left(\frac{a_k}{2}r_{iq}\sin\theta + N\frac{b_k}{2}\cos\theta\right); \text{ and}$$

a second waveform portion correlated by the QPN spreading sequence, $c_q(t)$, the second waveform having the equation:

$$y_2^q(t) = \frac{a_k}{2}r_{iq}\cos\theta + N\frac{b_k}{2}\sin\theta + j\left(\frac{a_k}{2}r_{iq}\sin\theta - N\frac{b_k}{2}\cos\theta\right)$$

where $\int c_q(t)\bar{c}_q(t)dt = -N$.

BRIEF DESCRIPTION OF THE DRAWINGS

The present invention will be described in further detail with reference to the accompanying drawings, in which:

FIG. 4b is a block diagram of the baseband correlator 200 and demodulator 206 portions of the hub/gateway processing shown in FIG. 4a.

FIG. 4d is a block diagram of a portion of the baseband correlator 200, the demodulator, and the demultiplexer 162 shown in FIG. 4b.

FIG. 5 is a TDM frame associated with the outbound transmission from the hub/gateway of FIG. 4a;

FIG. 6 is a control/synchronization frame associated with the VSAT parameter estimation process of FIG. 4a.

FIG. 7b is a block diagram of the differential encode 370, PN code generation 346, XOR 376, and modulator 380 portions of the VSAT processing shown in FIG. 7a.

FIG. 8 shows the synchronous relationship of the distinct spreading code sequences used in the Cyclic Code Phase Multiple Access inbound transmissions of FIG. 3.

FIG. 9 shows the cyclic correlator receiver used for CCPMA demodulation at the gateway station of FIG. 4a.

FIG. 10 depicts the operation of the CCPMA correlative receiver of FIG. 9.

DETAILED DESCRIPTION OF THE PREFERRED EMBODIMENT

The following detailed description of the preferred embodiment presents a description of certain specific embodiments of the present invention. However, the present invention can be embodied in a multitude of different ways as defined and covered by the claims. In this description, reference is made to the drawings wherein like parts are designated with like numerals throughout.

For convenience, the discussion of the preferred embodiment will be organized into the following principal sections: CCPMA System Description, Preferred Modulation For CCPMA, Preferred Sequence Set for CCPMA/BSQPN, Preferred BSQPN Modulator Implementation, and Cyclic Code Phase Multiple Access (CCPMA) Details.

CCPMA System Description

Figure 1:
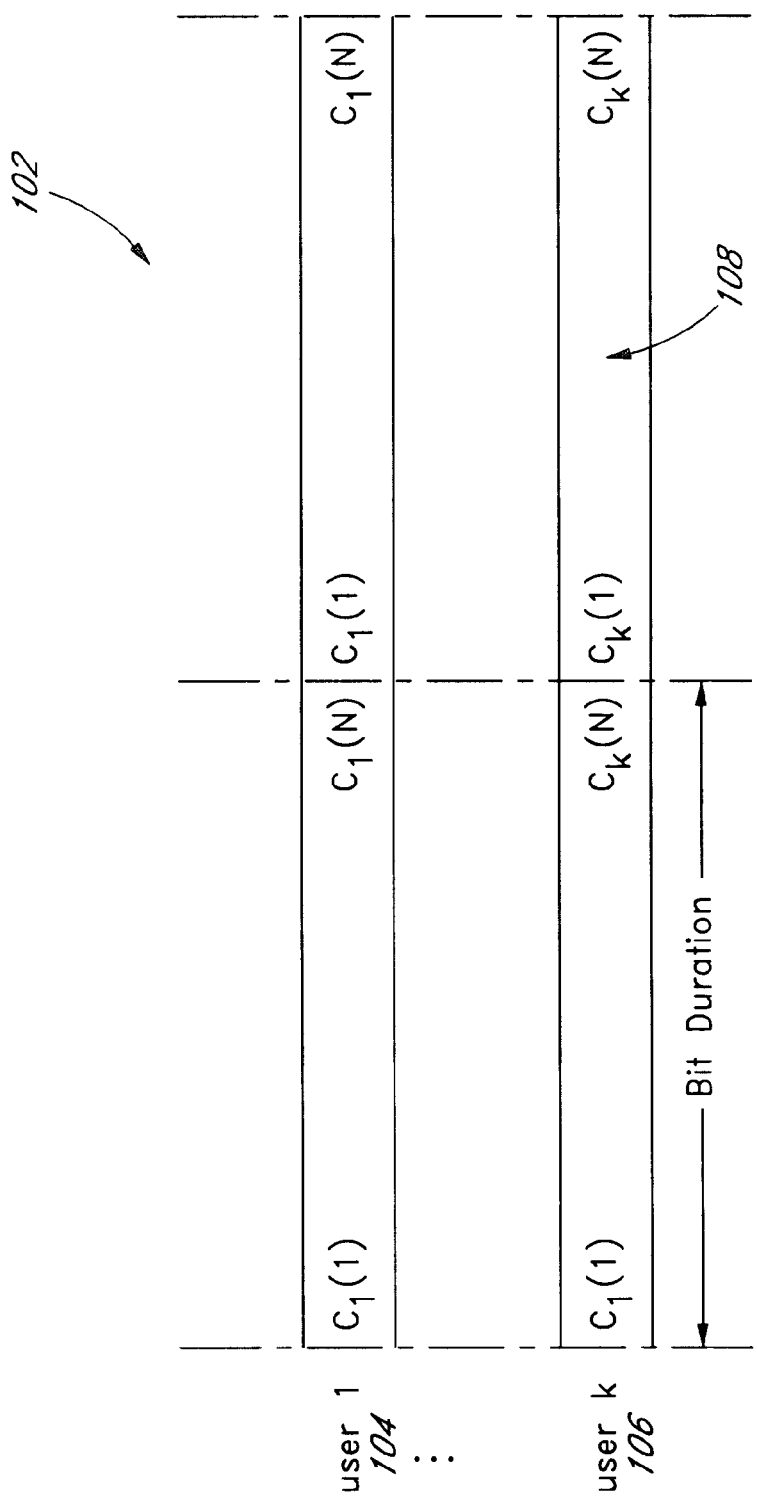
FIG. 1 depicts the synchronous relationship of the distinct spreading code sequences used in synchronous code division multiple access.
Figure 2:
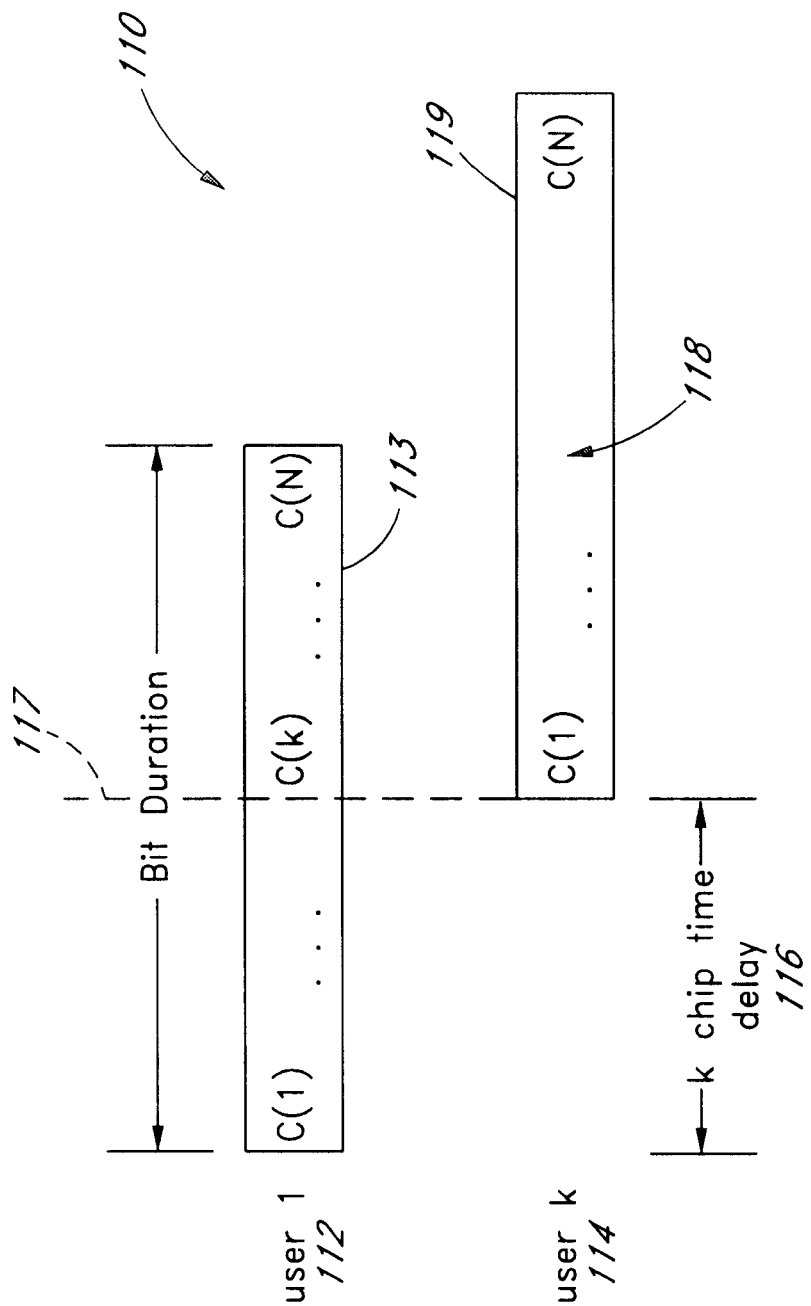
FIG. 2 depicts the synchronous relationship of a single spreading code sequences as used in a spread slotted ALOHA system.
Figure 3:
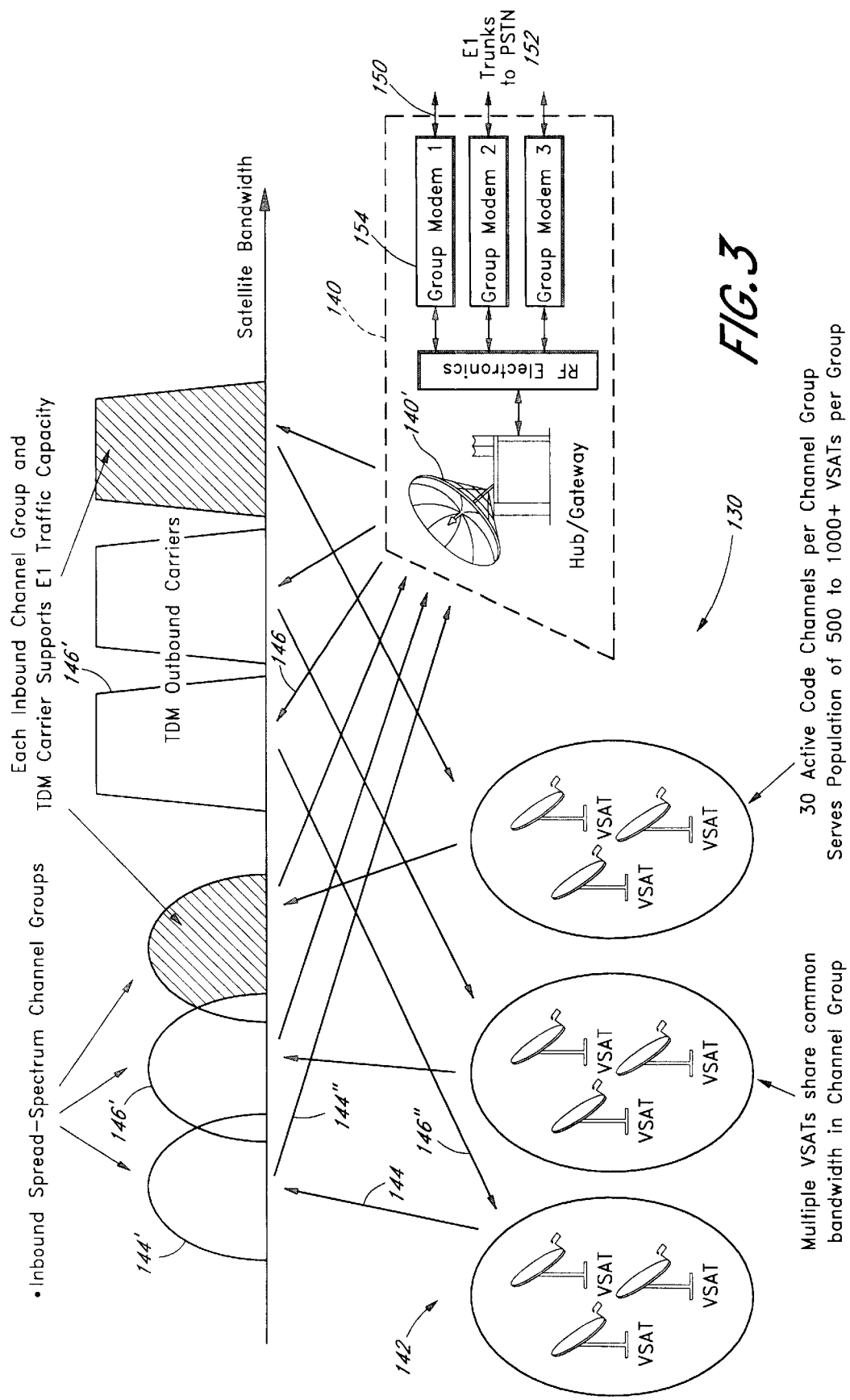
FIG. 3 is a block diagram of the cyclic spread satellite communications system according to a first embodiment of the present invention.

Referring now to FIG. 3, there is shown a CCPMA satellite communication system 130 according to one embodiment of the present invention. The system comprises a central gateway station 140, for access to the public switched telephone network, and a plurality of satellite terminals 142 interconnected to the gateway station 140 by means of a satellite transponder (160, FIG. 4a). These satellite terminals are presently preferred to be VSAT stations and, for convenience, will be further referred to as such. Nevertheless, one skilled in the relevant technology will recognize that other types of earth-based stations communicating with a satellite are a part of this invention. Communications between a set of remote VSATs and the Hub/Gateway is performed using a channel group. Each channel group includes a full duplex channel, e.g., 144, 144", with a shared spread-spectrum bandwidth, e.g., 144', for inbound communications from the VSATs 142 to the Gateway 140 and a Time Division Multiplexed outbound channel, e.g., 146, 146", from the Gateway 140 to the remote VSATs 142. In the inbound direction, remote VSATs 142 share the same bandwidth, e.g., 144', using a new cyclic code phase multiple access (CCPMA) modulation scheme, as disclosed in this invention.

The gateway interfaces to the public network, that is to a local exchange, by means of one or more digital multiplexed pulse code modulation (PCM) signals. In the preferred embodiment, this is by means of a 2.048 Mbps link per ITU G.703/704 which supports 30 voice channels per circuit. Each channel group provides the equivalent traffic carrying capacity of a single E1 circuit 150, that is, an inbound spread-spectrum channel group, e.g., 144, plus its TDM outbound channel, e.g., 146, are capable of carrying 30 full duplex voice circuits. A channel group may support a large number of VSATs 142. All VSATs continuously monitor their assigned outbound TDM channel checking for channel assignment. A channel assignment would reflect that a given VSAT has an incoming call from the PSTN 152. Likewise, a given VSAT, upon detection of an off-hook condition, would signal the hub/gateway 140 over the inbound shared channel group indicating the need to make a connection to the PSTN 152. Although only 30 channels may be active at any time, by operating in a demand assigned manner, 500 to 1000 or more VSATs 142 may be operate within a common channel group under normal subscriber traffic conditions.

The representative system depicted in FIG. 3 supports three channel groups for a total traffic carrying capacity of 3 E1 (Europe Signal Level 1) circuits 150, or 90 full duplex channels. Each channel group is processed by a single channel Group Modem 154 in the hub/gateway station 140. Each group modem 154 provides a single E1 interface to the PSTN 152.

Figure 4A:
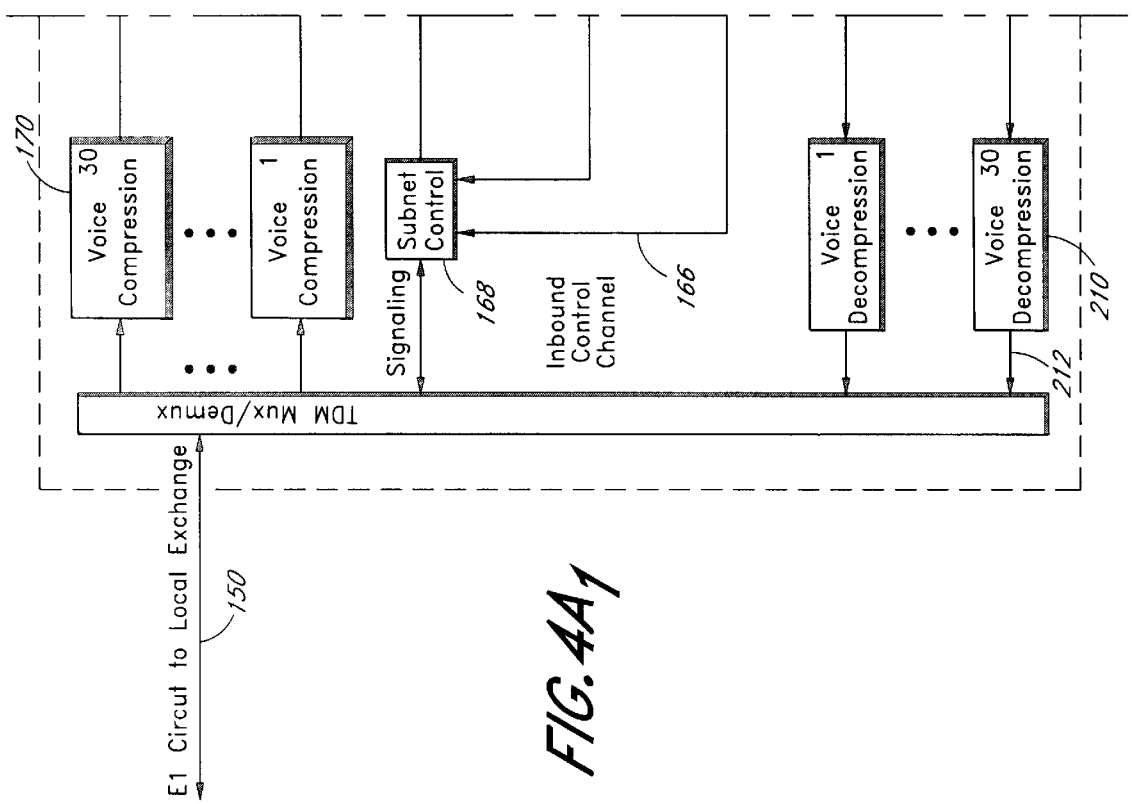
FIG. 4a is a more detailed diagram showing the hub/gateway processing of FIG. 3.

Referring now to FIG. 4a, there is shown the details of a hub/gateway station, 140 capable of processing a single channel group. The PCM signal is entered into the gateway station 140 and is demultiplexed 162 into 30 individual 64 kbps voice channels, e.g., channel 164, and a signaling channel 166. The signaling channel 166 is routed to a subnet control processor 168 to identify incoming calls and thereupon signal the appropriate remote VSAT. The 30 voice channels are individually compressed, e.g., compression module 170, to lower the transmission data rate, forward error correction encoded and are then multiplexed 172 together and with a single control/synchronization channel 174 from the subnet controller 168 to form a TDM outbound channel 176. In the preferred embodiment, the voice compression process, e.g., 170, reduces the incoming 64 kbps PCM voice signal to 4800 bps for transmission over the satellite 160. In the preferred embodiment, the compressed voice signal is transmitted in the form of a voice packet, where a new voice packet is formed every 20 msec.

Figure 5:
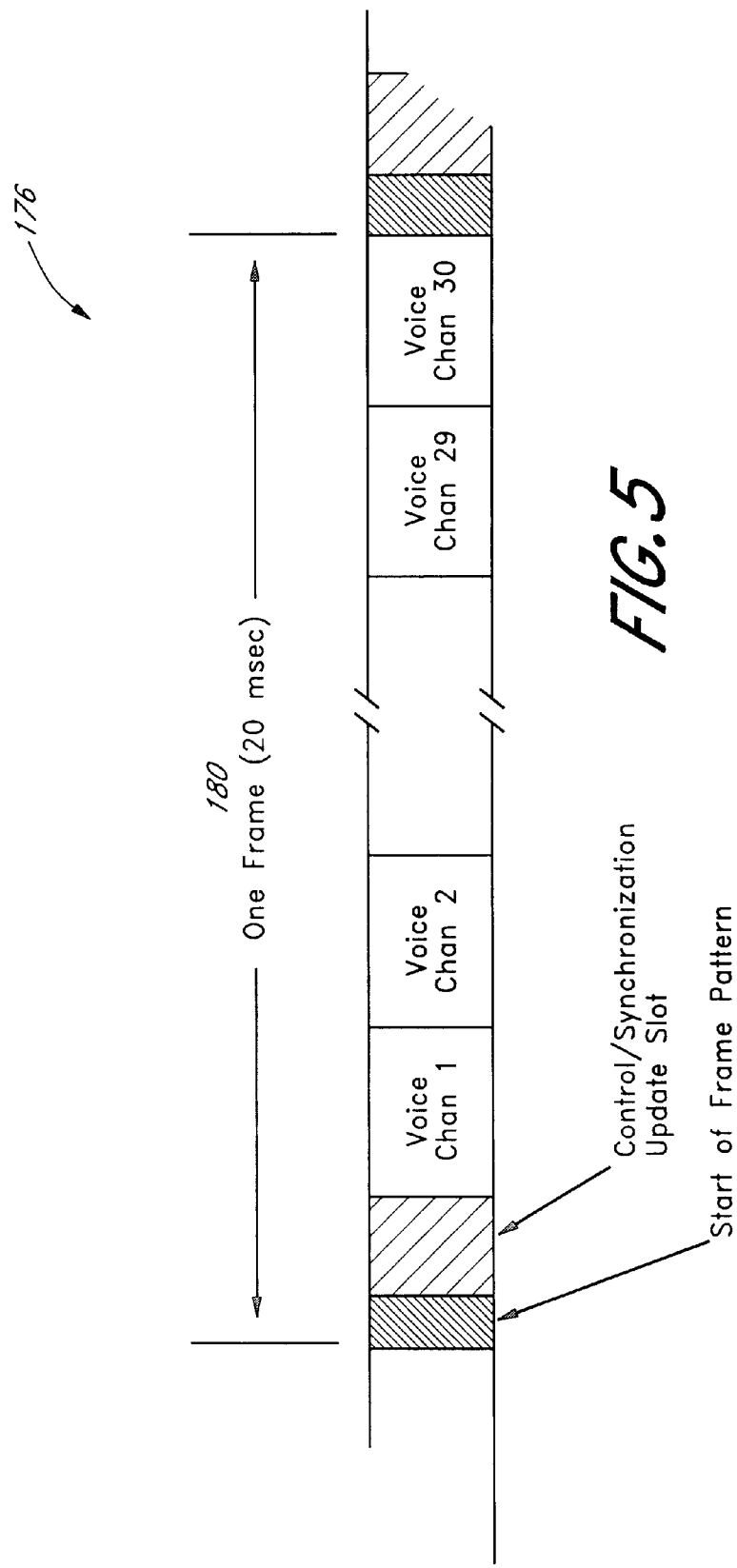

The multiplexed outbound channel 176 contains up to 30 active voice channels and the single control/synchronization channel 174. All VSATs assigned to the group receive the control/synchronization channel 174. Active VSATs, i.e., those currently involved in a call, listen to both its assigned voice channel and the control channel 174. Each active VSAT independently recovers only its assigned voice channel. The control/synchronization channel 174 is used to pass call assignment commands to the VSAT and to function as a frame reference to aid the VSATs in synchronizing to the outbound TDM signal 176. This multiplexed signal 176 is depicted in FIG. 5. In the preferred embodiment, the frame duration 180 is set to 20 msec such that each voice channel can transmit a single voice packet per frame. Like the voice channel, the control channel 174 is also operated at 4800 bps with 3 bytes (24 bits or 1200 bps), for frame synchronization. This leaves 3600 bps for channel assignments and synchronization updates. In this preferred embodiment, the TDM transmission bit rate is 31×4800 or 148.8 kbps.

Referring back to FIG. 4a, the TDM signal is convolutional encoded 182 for forward error correction capability and phase shift keyed (PSK) digitally modulated, 184 onto the carrier. In the preferred embodiment, forward error correction 182 is performed as a convolutional encoding of each channel with a code rate of ½ and a constraint length of 7 or 9. The output of the Phase-Shift Keying (PSK) modulator 184 is coupled to an upconverter 186 in which the PSK modulated signal is translated to an uplink frequency of the satellite 160. This upconverted signal is passed through a high-power amplifier 188 and diplexer 190 to the gateway stations antenna 140' for transmission to the satellite transponder 160.

A signal, e.g., 192, from each active VSAT station, e.g., 194, (currently assigned to a call) is transmitted through the transponder 160 and received at the central gateway station 140 by the antenna 140' and applied through a diplexer 190 and low noise amplifier 196 to a downconverter 198 where it is translated to a baseband frequency, digitized and applied to a baseband correlator 200. The baseband correlator 200 includes a tapped delay line which is clocked by a chip rate clock generator 204 to successively shift the received PSK modulated samples at the chip rate. In the preferred embodiment, this chip rate is 31×4800×2=297.6 kcps for operation at 4800 bps. Successive taps of the multipliers (c1 through cN) are respectively set to different values (+1 and −1) corresponding to the bits of the cyclic patterns with which the data bits of the VSAT stations have been modulo-2 summed, or spread by. The outputs of the multipliers are summed by an adder for coupling to a Differential Phase-Shift Keying (DPSK) demodulator 206.

The DPSK demodulator 206 sequentially demodulates each of the 31 inbound channels with the outputs demultiplexed 162 and individually Viterbi decoded, e.g., by decoder 208. The 30 voice data streams are decompressed, e.g., by decompression module 210, to form 64 kbps PCM channels, e.g., channel 212, which are multiplexed to form a 2 Mbps E1 interface 150 to the local exchange. The control channel 166, channel 1, is routed to the subnet control processor 168. This channel 166 is used by, the VSATs to transmit periodic status updates and to transmit VSAT call (channel assignment) requests.

On the transmit side, the gateway station 140 also comprises a reference clock generator 204 used as a system reference 214 for the generation of the transmit time division multiplexed signal and as a reference 216 for the receive processing. This reference 216 is used as the receive chip clock reference for the baseband correlator 200.

For efficient operation of the CDMA system, the gateway/hub 140 is responsible for coordinating the transmissions of all the remote VSATs. This coordination includes maintaining synchronous operation between the CDMA channels within a single carrier group, maintaining power control of each of the VSATs to minimize multiple access interference, and frequency estimates to provide good performance in a satellite Doppler environment. In this system 130, time and frequency error estimates are periodically formed and broadcast to the individual VSATs for immediate implementation. In the embodiment of FIG. 4a, the gateway station 140 performs timing error ($\Delta T$), frequency error ($\Delta F$) and amplitude/power error ($\Delta P$) measurements on each of the active channels at a VSAT synchronization processor 222 to aid the VSATs in maintaining network synchronization. These estimations are then processed, which determines whether the VSAT should advance (increase), retard (decrease) or make no change, relative to its current level. Recovered, despread baseband samples 220 are sequentially routed from the baseband correlator 200 to the VSAT synchronization processor 222. All VSATs, including those not currently involved with a call, must maintain synchronization with the hub/gateway. Each VSAT will periodically, on a preassigned, round-robin basis, transmit status/synchronization updates to the hub 140. Alternating frames are used for this purpose. That is, odd numbered frames are used for call request transmission while even numbered slots are used for synchronization updates. The VSAT synchronization unit 222 operates only on the synchronization and voice traffic slots.

Figure 6:
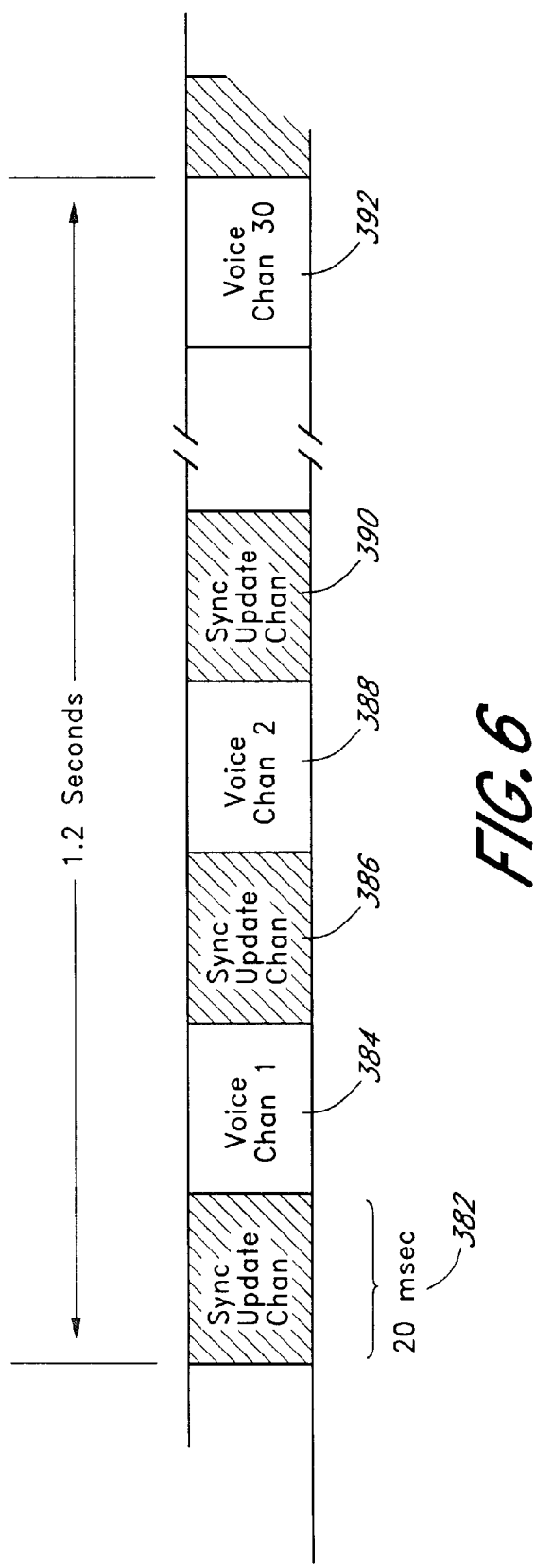

Referring to FIG. 6, synchronization estimates are processed on 20 msec intervals, such as interval 382, (96 bits at 4800 bps) sequentially starting with control/synchronization interval 382 and voice channel 1 (384), then processing, control/synchronization slot 386, then processing voice channel 2 (388), then again processing control/synchronization slot 390, and so forth, finishing with voice channel 30 (392). In this embodiment, this process takes 1.2 seconds with a total of 60 estimates formed. Note also that, in this embodiment, with 500 VSATs assigned to a channel group, each VSAT has an opportunity to updates its synchronization every 500×2×0.02=20 seconds. All 60 estimates are then combined into a single synchronization control packet (on channel 174, FIG. 4a) and broadcast to the VSATs in the outbound control/synchronization slot.

Returning to FIG. 4a, the VSAT synchronization processor 222 in one presently preferred embodiment may be implemented by executing timing, frequency and power error measurement algorithms using a commercially available digital signal processor (DSP). The timing error ($\Delta T$) measurements are performed using the known early-late tracking algorithm. The frequency error ($\Delta F$) measurements and the amplitude/power error ($\Delta P$) measurements are performed using known algorithms as modified to make use of information available in the differentially encoded waveform.

Figure 4B:
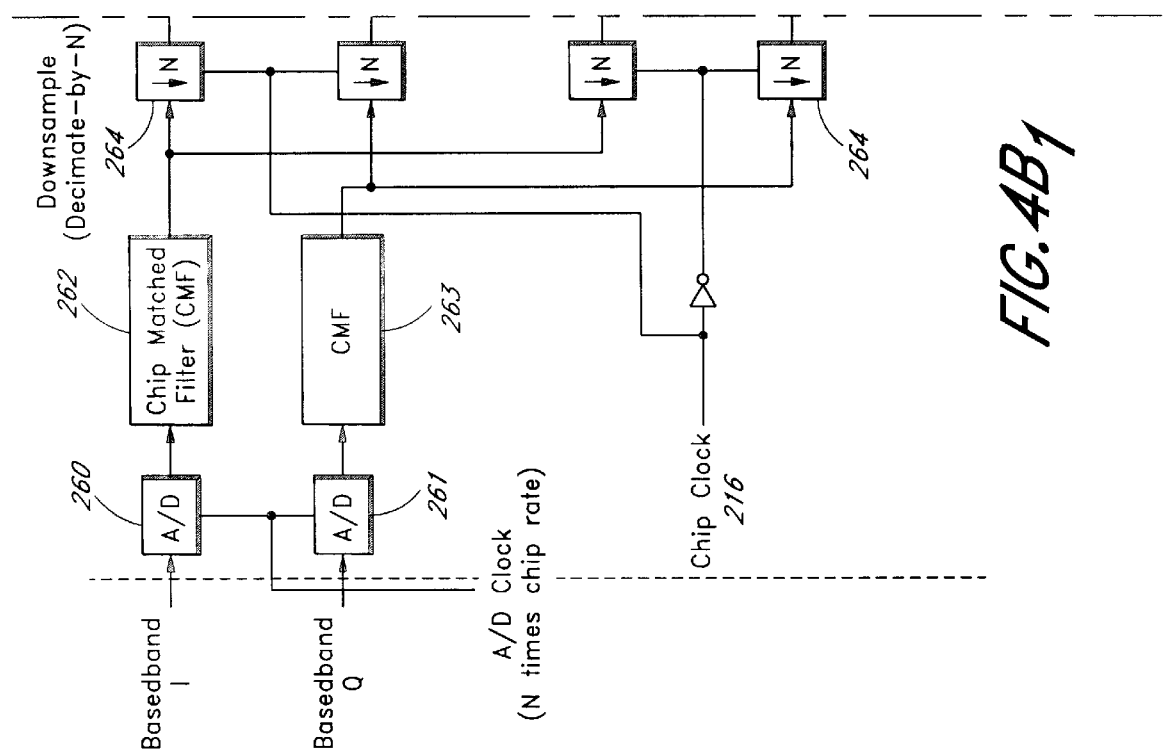

The baseband correlator 200, differential demodulation 206 and demultiplexing 164 processes of FIG. 4a are shown in greater detail in FIG. 4b. The inputs to the correlator section 200 are the inphase and quadrature (I and Q) baseband analog signals from the downconverter 198 (FIG. 4a). Note that at this point in the figure, these signals are the composite of all active CDMA channels within the channel group. These signals are analog-to-digital converted (A/D) 260, 261 at a rate of N times the receive chip rate. In the preferred embodiment, N is nominally 8 samples per chip. The digitized signal is then chip matched filtered (CMF) 262, 263 to improve the composite signal-to-noise ratio prior to further processing. In the preferred embodiment, each of the CDMA channels are square-root raised cosine spectrally shaped using Nyquist pulse shapes. Each of the CMFs, such as CMF 262 is a multi-stage finite impulse response filter (FIR) where the coefficients are matched to the Nyquist pulse shape at the N samples per chip. These filters 262 nominally span at least three chips (i.e., 24 taps in length). These filters can be implemented using a host of off-the-shelf FIR filter chips, such as the Harris HSP43168.

The chip matched filtered results are then applied to a set of four correlator modules, such as module 270, that are part of the baseband correlator 200 to despread the I and Q codes in both the inphase and quadrature baseband channels. Since the signals have been matched filtered, and since the system is being operated synchronously, the samples can be decimated down to the chip rate. Decimation is a known process of sample rate reduction. This is performed with a reclocking mechanism 264 as shown. Recall that the quadrature channel is modulated with a ½ chip duration staggering relative to the inphase channel. This staggering is accommodated by the reclocking of the Q code samples with the inverted chip rate clock. The decimated samples are stored by a function 272, with zeros inserted, prior to being passed through an appropriate I or Q code correlator processor 274 or 275, respectively. The functional reasons for this zero insertion are discussed with reference to FIG. 9. A more detailed discussion of the implementation follows hereinbelow. The correlator, being matched to recover BSQPN signals, performs the actual despreading function to recover the channel's data samples. Binary Staggered Quadrature Pseudo-Noise (BSQPN) signals are described hereinbelow. These samples are recovered in a TDM fashion with channel 1 samples appearing with the first clock, channel 2 on the second clock, and so forth for the whole group of 31. Recall that each symbol is divided into two equal sections with the PN code repeated for each half for the I channel and the reciprocal code inverted for the second half for the Q channel. By delaying, through a function 280, the recovered samples by 31 and zero insertion (as described hereinbelow), the two recovered samples are then time-aligned and may be added for the I channel, by a summer 282, and subtracted for the Q channel, by a summer 283, to form the final data samples. These samples, at two samples per symbol at this point in the receiver, are decimated by two (286) to reduce the rate down to the symbol rate. The I and Q samples are then individually differentially detected (300, 301, respectively) and then multiplexed together 302 to form a final output data stream. This post correlator summing and differential detection implementation is also discussed in more detail below in reference to FIG. 4d.

Figure 4C:
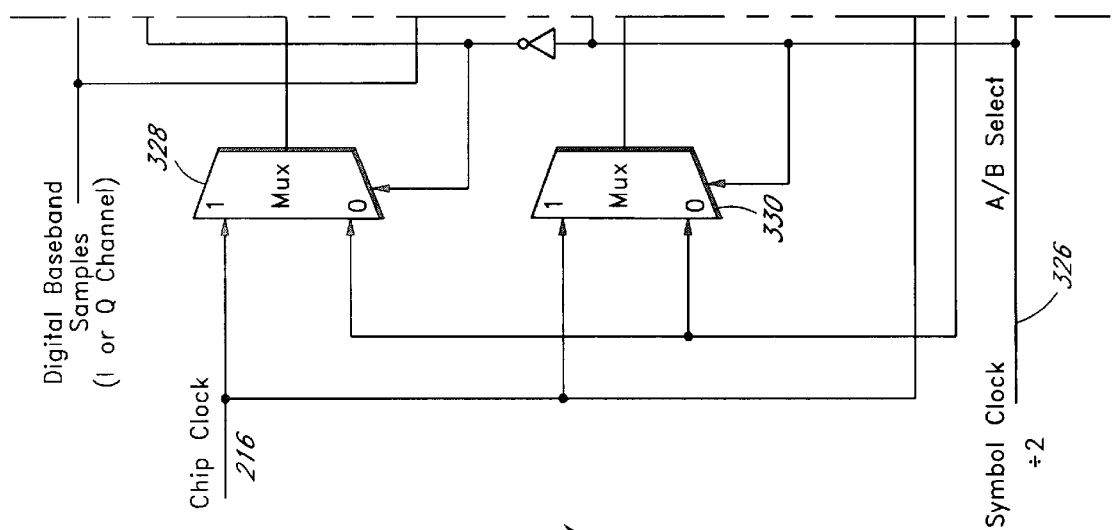
FIG. 4c is a block diagram of a portion of the correlator module 270 defined in FIG. 4b.

FIG. 4c expands on the baseband correlator implementation addressed in FIG. 4b. Specifically, the Chip Samples Store and Insert Zeroes function 272 and the code correlator processor, such as processor 274 or 275, of the correlator module 270 will be described. Input baseband samples are stored in a ping-pong random access memory (RAM) arrangement comprising a pair of elements, "A" RAM 320 and "B" RAM 322. This allows samples to be written into one RAM at the chip rate (clock 216), while samples from the previous symbol period are read out of the second RAM at a higher clock rate (Process Clock 324). Functionally, a symbol clock divided-by-two line 326 provides the A/B RAM read/write selection control. During "even" symbol periods, samples are written to the "A" RAM 320 while samples are "read" from the "B" RAM 322. This process is reversed for the "odd" numbered symbols. Clocks are also multiplexed by multiplexer 328 for the "A" RAM 320 and by multiplexer 330 for the "B" RAM 322 such that the Chip Clock 216 is used for writing data to the RAMs 320, 322 while the Process Clock 324 is used for reading from the RAMs 320, 322. Write Counter 332 is used to provide independent addressing for the write process, and read counter 334 is used to provide independent addressing for the read process.

Data is buffered in the RAMs 320, 322 to enable the correlator module 270 to insert zeros prior to processing by the code correlator processor, such as processor 274. Zero insertion is controlled by a counter 340 and threshold detector 342 arrangement as shown in the middle of FIG. 4c. The counter 340 operates in a modulo 61 fashion (counts from 0 to 60 and then repeats), and is reset or started at the data symbol boundary. During the first 30 clock cycles, the output of the threshold detect 342 is low forcing (1) a multiplexer 344 to select zeroes for input to the correlator 274, and (2) sets the enable to the read address counter 334 to a low thereby disabling the counter. When the counter 340 output is greater than or equal to 30 (the $31^{st}$ clock cycle), the threshold detect 342 goes high enabling the read address counter 334 and also controlling the multiplexer 344 to select the data path from a multiplexer 346. Multiplexer 346 has inputs from the "A" RAM 320 and the "B" RAM 322. The select line is the inverted symbol clock divided-by-two on line 326. For counter outputs from 30 to 60 (31 clock cycles total), data is read from the appropriate RAM and passed to the correlator.

A code correlator processor, such as I code correlator processor 274, is shown on the right hand side of FIG. 4c. Correlator processor 274 is a tapped delay-line device of length 61 with all 61 taps 350 summed by summer 352 to form the final correlator output 354. Coefficients A1 through A61 are pre-configured to match the master code symbols as discussed with reference to FIG. 9.

The portion of the baseband correlator depicted in FIG. 4c can be implemented with off-the-shelf digital components. The RAMs 320, 322 are sized 32×8, are low-cost and are available from numerous manufacturers. In the embodiment shown, the correlators 274, 275 can be implemented with a Stanford Telecommunications model STEL-3310 Digital Matched Filter/Correlator chip. This chip is a 64 tap device where the first 61 taps would be used and the last three taps would be set to zero. The majority of the logic circuitry of the function 272 can be easily embedded in a single programmable logic device, such as a field programmable gate array (FPGA) or a programmable array logic (PAL) chip.

Referring back to FIG. 4b, the baseband correlator 200 operates on a half symbol basis with the results of the two half symbols summed by summer 282 prior to further processing. This operation is shown in greater detail in FIG. 4d. Each successive sample from the correlator 200 provides a despread result for one of the CDMA channels such that the output is time-division-multiplexed (TDM) in nature. In the embodiment shown in FIG. 4d, a new sample appears for each channel every 61 clock cycles. As shown, input samples are applied directly to one port of a digital adder 282 with the samples also delayed by 61 clock cycles and input to the other port of the adder 282. This delay is implemented with a set of shift registers 280 clocked at the chip rate 216. When the samples are added, a final symbol result is formed for a given CDMA channel. For a given symbol, S(n), there are two half symbol results to be added, e.g., $S(n)_A$ and $S(n)_B$. The implementation as shown will add every half symbol set, that is $S(n)_A+S(n)_B$, $S(n)_B+S(n+1)_A$, $S(n+1)_A+S(n+1)_B$, and so forth. As such, only every other result is valid such that the adder output is decimated-by-two by latching the output (by use of decimation latch 286) using a Chip Clock divided-by-two clock 360. Note that because of the zero insertion process, there are actually 61 results being processed, not just the 31 valid channel results. These additional invalid samples are eliminated at the end of the processing, as will be shown.

The inphase and quadrature data symbols are independently differentially encoded at the VSAT and must be independently detected by the demodulator 206 at the hub 140 prior to multiplexing 302 into a final data stream 370. In general, a differential phase shift keyed (DPSK) signal can be detected by performing the following function, $$d(n)=I(n)\cdot I(n-1)+Q(n)\cdot Q(n-1),$$

where I(n) and Q(n) are the matched filtered results for the $n^{th}$ symbol, and I(n−1) and Q(n−1) are the results for the previous symbol. For the BSQPN system 130, symbol results are separated by 61 clock periods. The I results are applied directly to one port of a digital multiplier 372, as shown, with the samples delayed by 61 clock periods and applied to the other port of the multiplier 372. This delay is implemented with a shift register 374 clocked by the Chip Clock divided-by-2 clock 360. The Q results are applied to one port of a digital multiplier 373, as shown, with the samples delayed by 61 clock periods and applied to the other port of the multiplier 373. This delay is implemented with a shift register 375 clocked by the Chip Clock divided-by-2 clock 360. Then outputs of the I multiplier 372 and the Q multiplier 373 are added by an adder 376. At this point in FIG. 4d, the inphase and quadrature data results have been recovered and are still in a TDM format. Symbol groups are recombined through the multiplexer 302 and routed to the appropriate output port through the final demultiplexer arrangement 162. Thus, the channels have been recovered, separated and may now be independently processed to recover the embedded voice and/or control channel.

Figure 7A:
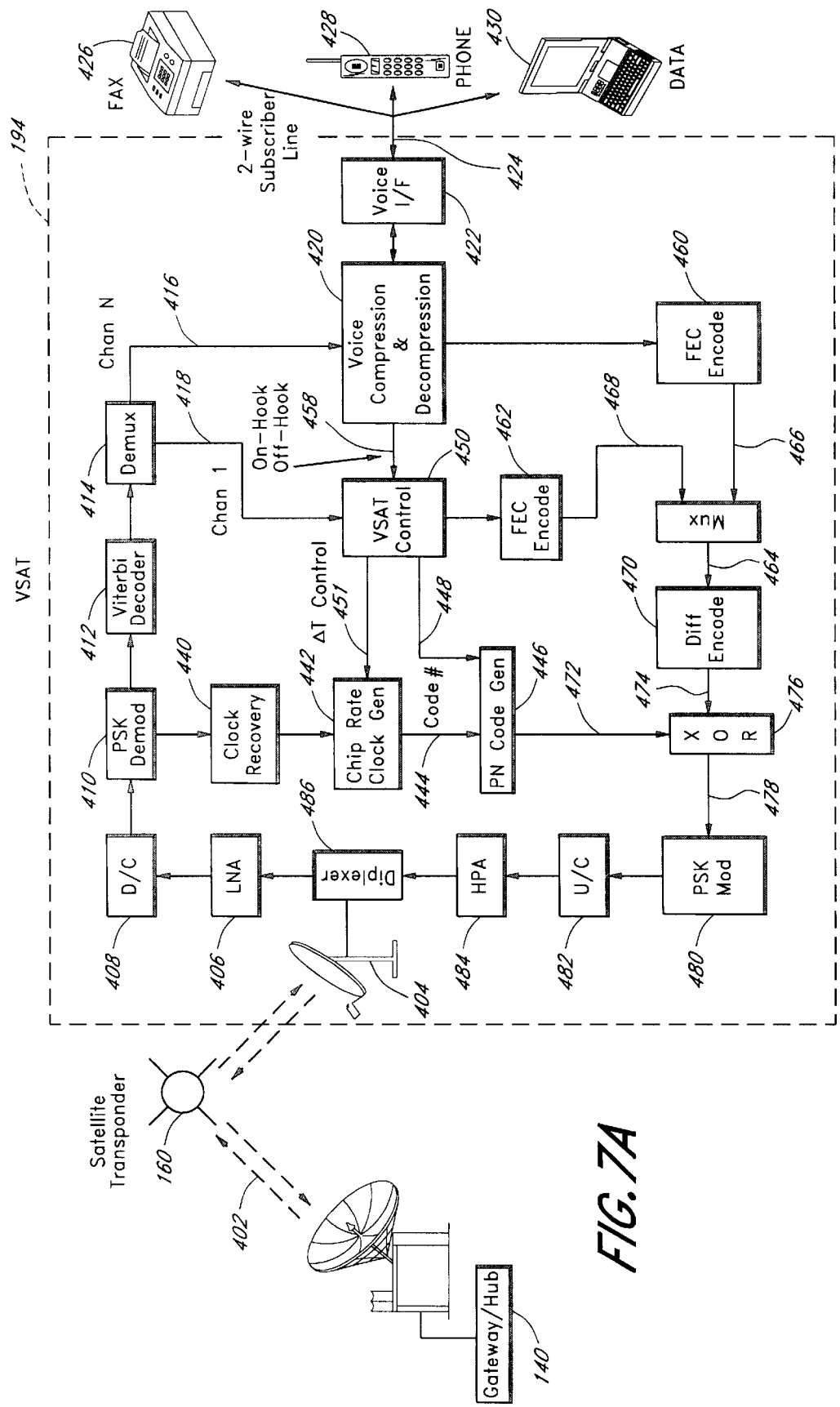
FIG. 7a is a detailed diagram showing the VSAT processing associated with the system of FIG. 3.

Referring to FIG. 7a, the functions performed by each CCPMA VSAT will be described. At the VSAT 194, the TDM outbound signal 402 from the gateway 140 is received at the VSAT antenna 404, is low noise amplified 406, downconverted 408 and PSK demodulated 410. The TDM signal is Viterbi decoded 412 and demultiplexed 414 to recover the voice channel 416 currently assigned to the VSAT 194 and the control channel 418, used to provide channel assignments and synchronization updates (time, frequency and amplitude) periodically to the VSAT. The decoded voice channel 416 is then decompressed 420, converted to an analog signal in the voice interface block 422, and drives a standard 2-wire subscriber phone interface 424. As depicted, the VSAT can drive any standard FAX 426, phone 428 or wireline data terminal 430 (e.g., V.32, V.32bis).

The bit timing recovered TDM clock recovered by a clock recovery block 440 is used as the timing reference for the VSAT 194 and provides the reference to a transmit chip clock generator 442. In the preferred embodiment, this clock is 32 times the TDM outbound rate, or approximately 4.8 MHz. This reference clock is divided by 16 in the chip rate clock generator 442 to form a transmit PN clock 444. This clock generator 442, in turn, drives the PN code generator 446 used to spread the inbound transmissions. Channel assignments from the hub 140 include a PN code 448 (one of 31) to be used for inbound voice channel transmission. This information is recovered from the outbound control packets on channel 418 by a VSAT Control process 450 wherein the assigned code number 448 is used to configure the PN code generator 446. Time adjustments on line 451 are commanded of the VSAT 194 through the control channel 418. These adjustments are used to maintain bit synchronous operation between the VSATs on the inbound channel. These commands on line 451 are used to adjust the timing phase of the chip rate clock at generator 442. By operating at 16 times chip rate, timing errors of $\leq \frac{1}{32}$ of a chip can be maintained.

On the transmit side of the VSAT 194, an analog voice signal is coupled through the 2-wire subscriber interface 424 to the voice interface (I/F) block 422 where the signal is converted from analog to digital. The digitized voice signal is then compressed 420 and convolutionally encoded 460 for forward error correction. In the preferred embodiment, the inbound and outbound voice compression rates are at 4800 bps. Also, in the preferred embodiment, the compressed signal is forward error encoded 460 using a convolutional code operating at a code rate of one-half and with a coistraint length of 7 or 9. The voice compression process 420 also identifies the presence of on-hook and off-hook conditions 458. This information 458 is passed to the VSAT Control block 450. When in an idle, non-active state, if the VSAT Control 450 is signaled that an off-hook condition exists, the VSAT Control process forms an inbound call request packet, forward error encodes 462 the packet, and configures the PN code generator 446 for the inbound control channel PN code 448. Note that inbound call requests are performed in a packetized fashion with requests made using standard slotted ALOHA techniques.

The transmit signal 464, voice 466 or control 468 but never both simultaneously, is then differentially encoded 470 and spread by the commanded cyclic shift PN code sequence 472. This spreading is accomplished by exclusive-OR'ing (XORing) the PN code 472 and the transmit data 474. The output 472 of the PN sequence generator 446 is applied to one input of an exclusive-OR gate 476 while the transmit data 474 is applied to the other input, such that each data bit 474 is modulo-2 summed with the PN sequence 472. A resultant spread bit stream 478 is applied to a PSK modulator 480 where it is used to modulate a carrier. The carrier is then translated to an uplink frequency by an upconverter 482. After power amplification 484, the uplink signal of the VSAT 194 is applied through a diplexer 486 to the antenna 404 for transmission to the gateway station 140 via the transponder 160.

Preferred Modulation For CCPMA

Figure 11:
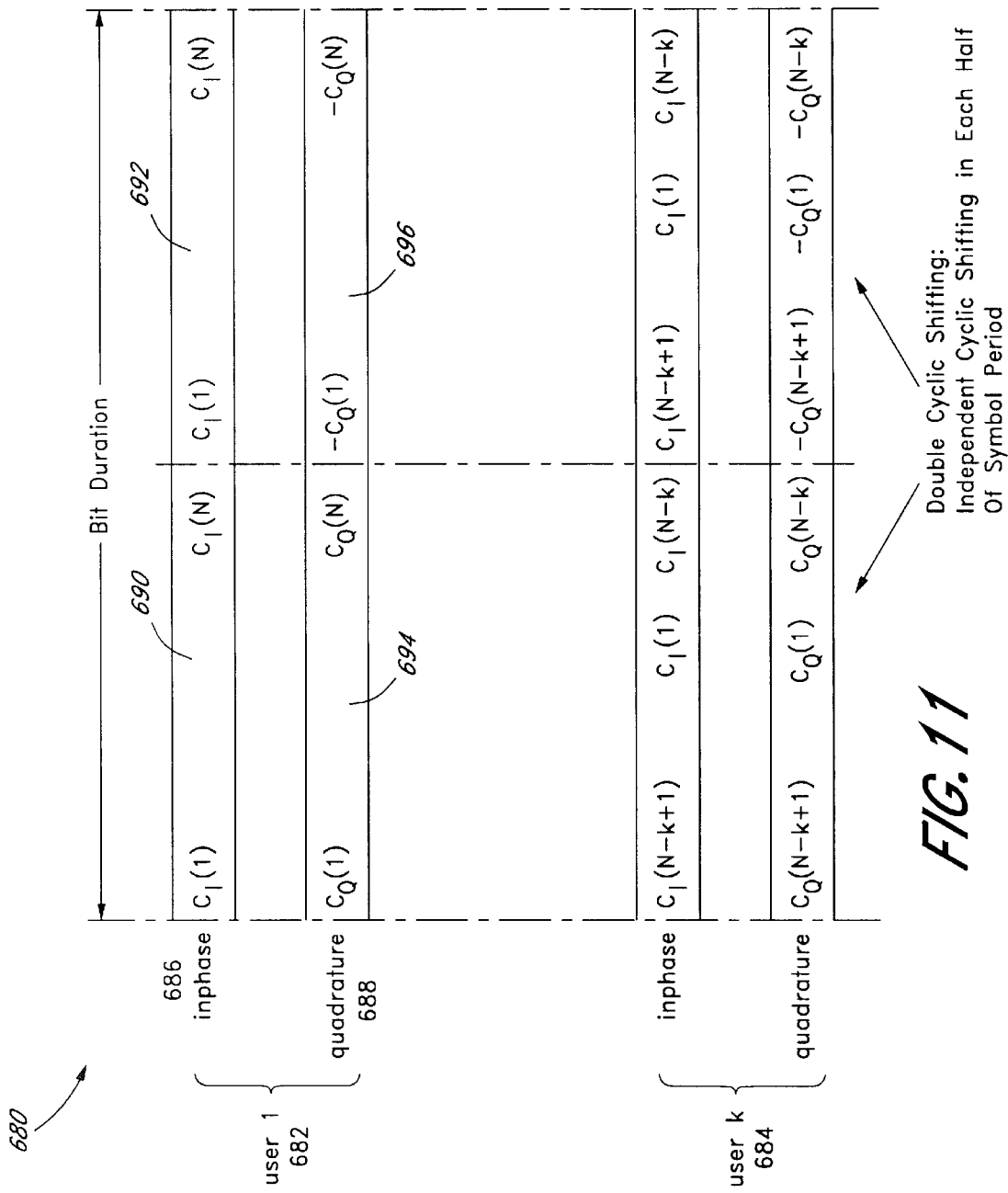
FIG. 11 is a diagram illustrating a binary staggered quadrature pseudo-noise (BSQPN) waveform utilized by the cyclic spread satellite communications system of FIG. 3.

In order to produce the lowest cost VSAT, low cost transmit oscillators are essential. The relatively poor phase noise characteristics of these components make phase coherent detection of the received waveform prohibitive, particularly at low bit rates. Also, transmit power efficiency is key to realizing a low cost product. But, power efficient class C or near class C amplifier operation requires constant envelope modulation formats. These quadrature waveforms have a relative staggering between the inphase (I) and quadrature (Q) component of one half the baud interval. Consequently, under these conditions, the preferred modulation would utilize noncoherent detection with staggering of the quadrature components. In the prior art, traditional methods, such as Minimum Shift Keying (MSK), have poor spectral containment as well as incurring additional losses when noncoherent differentially detected. Spectral containment is essential to achieving good multiple access efficiency and minimizing adjacent channel interference in multiple carrier operation. Good spectral containment can be achieved with staggered Quaternary Phase-Shift Keying (QPSK) having Nyquist pulse shaping, but, this waveform can not by differentially detected since the phase offset causes an ambiguity as to where the actual I and Q components reside. For Staggered Quadriphase Shift Keying (SQPSK) with quadrature PN (QPN) spreading, the unknown phase offset, combined with the staggering, forces the two PN sequences on inphase and quadrature components to be orthogonal at a half chip offset. This requirement is difficult if not impossible to meet, especially for chip pulses of practical interest. As a result, cross correlation interference can exist directly which reduces communication efficiency. The presently preferred embodiment of the invention utilizes a waveform similar to spread SQPSK but contains specific structure such that the receiver can cancel the cross correlation terms arising from a carrier phase offset, thereby enabling noncoherent detection. The new waveform 680 shown in FIG. 11 is therefore quadrature staggered for nonlinearity loss resistance, is differentially encoded and detected for phase noise resistance, is QPN spread such that CCPMA is supported and is Nyquist chip pulse shaped for spectral containment. The waveform has the same throughput as DS/BPSK with comparable Nyquist pulse shaping and is therefore called Binary Staggered QPN (BSQPN).

Referring to FIG. 11, a waveform 682 for user 1, e.g., satellite terminal 1, and a waveform 684 for user k are shown. With BSQPN, the I and Q data sequences are spread with different PN codes consistent with QPN spreading, wherein the Q component is staggered by one half chip. For an I component 686, each I data bit is binary differentially encoded. Each encoded bit is repeated once and spread with an N length chip sequence 690. Equivalently, this can be viewed as spreading by a 2N length sequence where this sequence is the concatenation of the N length sequence 690 with itself 692. For a Q component 688, each Q data bit is binary differentially encoded. Each coded bit is repeated once, but the repeated bit is inverted. Equivalently, this can be viewed as a spreading by a 2N length sequence where this sequence is the concatenation of an N length sequence 694 with an inverted versions 696 of itself. Note that when this waveform is used with CCPMA, the cyclic shifting of the PN sequences must be performed on the individual N length sequences. This systematic repetition of the data bits prior to spreading makes cancellation of the cross correlation particularly simple at the receiver. Introducing a phase offset of θ, BSQPN in the first half of a data interval is given by $$x_1(t) = \frac{a_k}{2}c_i(t)\cos\theta - \frac{b_k}{2}c_q(t)\sin\theta + j\left(\frac{a_k}{2}c_i(t)\sin\theta + \frac{b_k}{2}c_q(t)\cos\theta\right) \quad (2.1)$$

and in the second half of the data interval by $$x_2(t) = \frac{a_k}{2}c_i(t)\cos\theta - \frac{b_k}{2}\overline{c}_q(t)\sin\theta + j\left(\frac{a_k}{2}c_i(t)\sin\theta + \frac{b_k}{2}\overline{c}_q(t)\cos\theta\right) \quad (2.2)$$

where overbar denotes polarity inversion of the individual chips. The sequences $\{a_k\}$ and $\{b_k\}$ are the differentially encoded inphase and quadrature data sequences, respectively. $C_i(t)$ and $c_q(t)$ are the QPN spreading sequences. At the receiver, both (2.1) and (2.2) are correlated with both QPN sequences. First, correlating (2.1) and (2.2) with $c_i(t)$ yields $$y_1^i(t) = N\frac{a_k}{2}\cos\theta - \frac{b_k}{2}r_{iq}\sin\theta + j\left(N\frac{a_k}{2}\sin\theta + \frac{b_k}{2}r_{iq}\cos\theta\right) \quad (2.3)$$

where:

$$N = \int c_i^2(t)dt$$

$$r_{iq} = \int c_i(t)c_q(t)dt \quad (2.4)$$

and $$y_2^i(t) = N\frac{a_k}{2}\cos\theta - \frac{b_k}{2}\overline{r}_{iq}\sin\theta + j\left(N\frac{a_k}{2}\sin\theta + \frac{b_k}{2}\overline{r}_{iq}\cos\theta\right) \quad (2.5)$$

where $$\overline{r}_{iq} = \int c_i(t)\overline{c}_q(t)dt = -r_{iq} \quad (2.6)$$

Summing (2.3) and (2.5) and using (2.6) provides the desired cancellation in the inphase component, namely, $$z_i = y_1^i + y_2^i = Na_k(\cos\theta + j\sin\theta) \quad (2.7)$$

Equation (2.7) can now be differentially detected to obtained the I information bit. Now, correlating (2.1) and (2.2) with $c_q(t)$ yields $$y_1^q(t) = \frac{a_k}{2}r_{iq}\cos\theta - N\frac{b_k}{2}\sin\theta + j\left(\frac{a_k}{2}r_{iq}\sin\theta + N\frac{b_k}{2}\cos\theta\right) \quad (2.8)$$

and $$y_2^q(t) = \frac{a_k}{2}r_{iq}\cos\theta + N\frac{b_k}{2}\sin\theta + j\left(\frac{a_k}{2}r_{iq}\sin\theta - N\frac{b_k}{2}\cos\theta\right) \quad (2.9)$$

where the following fact has been used $$\int c_q(t)\bar{c}_q(t)dt = -N \quad (2.10)$$

Now forming the difference of (2.8) and (2.9) provides the desired cancellation in the quadrature component, namely, $$z_q = y_1^q - y_2^q = Nb_k(-\cos\theta + j\sin\theta) \quad (2.11)$$

Equation (2.11) can now be differentially detected to obtain the Q information bit. Also note from (2.7) and (2.11) that due to QPN spreading and the unique cancellation technique, superior performing binary differential detection is employed in contrast to quaternary differential detection.

Preferred Sequence Set for CCPMA/BSQPN

The mother code sequence used in CCPMA must possess the property that its cyclic correlation function take on very small values for non-zero cyclic shifts (code sidelobes). It is impossible to find a real sequence whose sidelobes are perfectly zero. Consequently, an additional desirable property is uniformity in the sidelobe level. This insures that no single user is adversely degraded or receives preferential performance improvements with respect to the remaining users and also that the average MAI is zero. Sequences with good linear correlation properties but with poor cyclic correlation properties are not of interest. Under these conditions the preferred sequence is the maximal length sequence (MLS). The cyclic correlation function for an N length MLS is N for zero cyclic shift and −1 with each remaining N−1 shifts. When BSQPN is used with CCPMA, a mother code sequence for I as well as Q is required. Since the reciprocal of a MLS is another distinct MLS, the preferred sequence is an MLS on I and the reciprocal MLS on Q. For a length 31 MLS, there exist 3 code polynomials. These codes and their reciprocals are used in multiple carrier networks to reject adjacent channel interference while supporting symbol rate channel spacing.

Preferred BSQPN Modulator Implementation

The BSQPN modulator implementation associated with the VSAT of FIG. 7a is shown in block diagram form in FIG. 7b. The BSQPN modulator includes the Differential Encode 470, the PN Code Generator 446, the XOR module 476, and the QPSK modulator 480 shown in FIG. 7a. The forward error correction encoded transmit data bits 464 are input to the modulator at the baseband symbol rate 502 (two times bit rate). This symbol rate clock 502 has a 50% duty factor, with data latched on the rising edge of the clock.

The data sequence, $d_k$ (464), is demultiplexed into two sets of binary streams, where the inphase (I) stream 508 is formed by the even samples of $d_k$ (designated as $d_{k(even)}$) and the quadrature (Q) stream 510 is formed by the odd samples ($d_{k(odd)}$). These samples are double-latched 512 to align them in time. As depicted, the symbol rate clock is divided by two 514 to form a bit rate clock 516. The clock is then inverted 518 such that the rising edge of the non-inverted clock 516 corresponds to the even symbols and the inverted clock 518 corresponds to the odd samples. The two signals are then reclocked (latches 512) with the bit rate clock to align them in time. The even and odd data streams are then independently differentially encoded 470, 470' into a new binary sequence, $w_{k(even)}$ 520 and $w_{k(odd)}$ 521, with the operation:

$$w_k = d_k \oplus w_{k-1}.$$

This operation is implemented with an exclusive-OR (XOR) gate 504 wherein the binary data stream $d_{k(even)}$ 508 is input to one port on the XOR while the output, $w_{k(even)}$ 520, is latched by latch 506 and fed back to the other port. Similarly, an XOR gate 505 receives the binary data stream $d_{k(odd)}$ 510 at one port on the XOR while the output, $w_{k(odd)}$ 521, is latched by latch 507 and fed back to the other port. The $w_{k(even)}$ data 520 and $w_{k(odd)}$ data 521 are then fed to two XORs 522, 523, respectively, that perform the modulo-2 addition necessary to spread the data by an inphase (I) pseudo-noise (PN) code 524 and a quadrature (Q) PN code 526.

The outputs of the two spreading XOR's are align in time. As discussed in the section entitled "Preferred Modulation for CCPMA", time staggering is necessary to create a more constant envelope signal. This staggering is performed in the Q channel by delaying the Q spread symbols by one-half a chip period. This is implemented by providing an additional latch 530 at the output of the Q XOR 523 that is clocked with an inverted chip rate clock 532. The now staggered I and Q symbols are then analog-to-digital converted 534, 535 and lowpass filtered 536, 537, prior to QPSK modulation 480. This lowpass filtering is used to reduce sidelobe levels on the transmit waveform. In a preferred embodiment, this shaping is performed prior to analog-to-digital conversion 534, 535 using a finite impulse response (FIR) structure (not shown) to generate a Nyquist pulse shape using known techniques. Nyquist pulse shaping provides a signal with good transmission characteristics (low sidelobes), for good bandwidth efficiency, that does not suffer from intersymbol interference.

The QPSK modulator 480 quadrature upconverts the filtered I and Q data streams, $d_I(t)$ 540 and $d_Q(t)$ 541, respectively, to an intermediate frequency, $F_c$. This process is defined mathematically as, $$s(t) = d_1(t)\cos(2\pi F_c t) + d_Q(t)\sin(2\pi F_c t).$$

Depending on the desired intermediate frequency, the QPSK modulator 480 can be implemented with a set of double-balanced mixers 542, a broadband 0/90 degree hybrid 544 (splitter) and a broadband summer 546. In the preferred embodiment, with an IF in the L-band region, this modulator 480 is available as a fully integrated device, such as from NEC, California Eastern Laboratories, TEMEC, or RF Microdevices.

Referring to the bottom of FIG. 7b, the I PN code 524 and the Q PN code 526 are formed using a single PN generator 446. In the embodiment shown, this generator 446 is five stages long to create a 31 length maximal length code. As implemented and shown, polynomial [5,2] is used to generate this master code. The notation [5,2] indicates that the outputs of stage 2 (552) and stage 5 (554) are summed by a summer 556 and are then fed back to multiplexer 558 as a feedback path. Note that polynomials [5,4,2,1] and [5,4,3,2] may also be used to create the master code in a similar arrangement (not shown). This is useful from an adjacent channel carrier perspective, in that adjacent carrier groups can be generated with different polynomials to reduce cross-interference levels. In the preferred embodiment, the master code generator 446 is configurable to support all three code polynomials.

The code generator 446 is loaded and started in synchronization with the transmit bit rate clock 516 (the bit rate clock was previously described above), when an "Enable" signal 560 is set to a logical "1". The desired code phase or the code initial state condition 448 (FIG. 7a) is loaded into the register from the VSAT Control processor 450. Upon setting of the Enable 560, the multiplexers in the code generator 446 select the initial state with the results latched into the five latches. When the Enable signal 560 is brought low to a logical "0", the generator 446 begins the polynomial function and code generation by the circulation of the initial values through the code generator. Note that the initial code phase ranges only 00001 to 11111. Initial condition 00000 is not allowed.

The master code generator 446 creates a repeating sequence of code chips, $C_1$, $C_2$ through $C_{31}$. This set is used directly for the inphase (I) channel PN code 524 and is applied to one port of the I channel spreading XOR 522. The quadrature (Q) channel code 526 is formed as the reciprocal of the master code by running the master code through a first-in last-out (FILO) device 570 (also referred to as a reciprocal code generator). As shown, the code chips are sequentially latched into a set of 31 registers 572 with a multiplexer 574, and then a down counter 576 is used to read out the chips starting with $C_{31}$, and ending with $C_1$ and then is repeated. At call setup, once the master code generator 446 has been initialized, the Enable control signal 560 is set to a logical "1" allowing the registers 572 to be written. After the 31 registers 572 have been written, the Enable line 560 is set to a logical "0" thereby preventing any further changes to the register contents.

The code generators 446, 570 are clocked at the chip clock rate 444, defined as 1/T chips/sec (cps). In the preferred embodiment, with 31 length code generators, the overall PN code length is 62 chips, such that with a encoded data transmission rates of 9600 symbols per second (sps), the code chip rate is 62×4800 or 297.6 thousand cps.

As shown, the I code 524 is the master code, directly applied to the I channel XOR 522. This code is repeated twice over the symbol period to form an effective code length of 62 chips. The Q channel code 526, formed as the reciprocal of the master code 524, is modulo-2 added to the inverted bit rate clock 518 by means of another XOR 580. This modulo-2 addition causes the Q channel code 526 to be logically inverted for the second half of the data bit. As discussed in the sections entitled "Preferred Modulation for CCPMA" and "Preferred Sequence Set for CCPMA/BSQPN", this process creates an improved level of orthogonality between the I and Q codes thereby improving multiple access performance.

The digital portion of this invention, including the differential encoder 470, BSQPN spreading 476 and code generation 446, 570 functions can be physically implemented with discrete digital hardware, embedded in a gate array or application specific integrated circuit (ASIC), implemented with a micro-processor/digital signal processor (DSP) or combination of the above. In the preferred embodiment, the functions are embedded in a single ASIC.

Cyclic Code Phase Multiple Access (CCPMA) Details

The presently preferred embodiment of the invention utilizes a technique which achieves the superior performance of bit synchronous CDMA while benefiting from a low complexity implementation. With this technique, bit synchronous users are assigned separate and distinct code sequences for the spreading of information bits. The code sequences are obtained by cyclically shifting, by one chip time, a single code sequence, called the mother sequence 404, which possesses low autocorrelation sidelobes. Therefore, this technique for multiple access is referred to as Cyclic Code Phase Multiple Access (CCPMA). FIG. 8 illustrates the bit synchronous relationship 602 of the spreading sequence, e.g., 604, 606, of different users, e.g., 608, 610, respectively, obtained by cyclic shifts of the mother sequence 604. It is evident from this figure that each user's information bit, e.g., 612, is spread with a distinct code. Since an N length sequence can support up to N users, the problem of finding a large set of good codes in order to support large networks has been eliminated. Referring to FIG. 8, since the users are bit synchronous, MAI depends only on the sidelobes of the cyclic autocorrelation function of the mother code sequence. It does not depend on the sequence of transmitted bits as used with spread slotted ALOHA. Further, if the mother code sequence has uniform sidelobe levels then the average MAI will be zero. Hence the preferred mother code sequence used in generating the set of user code sequences is the maximal length sequence (MLS). Since the MAI level for CCPMA is lower than for spread slotted ALOHA, the bandwidth requirements for a specified level of throughput are lower for CCPMA. In fact, much like synchronous CDMA, CCPMA can simultaneously support N active users. As noted, spread slotted ALOHA cannot support N active users without increasing the bandwidth.

Like synchronous CDMA, a direct implementation of CCPMA would require a separate correlation receiver for each user. At a hub or gateway, a significant cost penalty is incurred if implemented in this manner. A reduced complexity implementation is identified herein which exploits the inherent relationship between the codes. This relationship is that each code is a chip-time, cyclic shift of another code. Due to this cyclic relationship, a linear correlator receiver like the one needed for spread slotted ALOHA cannot properly despread each user's signal. What is required is a cyclic correlation receiver.

Figure 9:
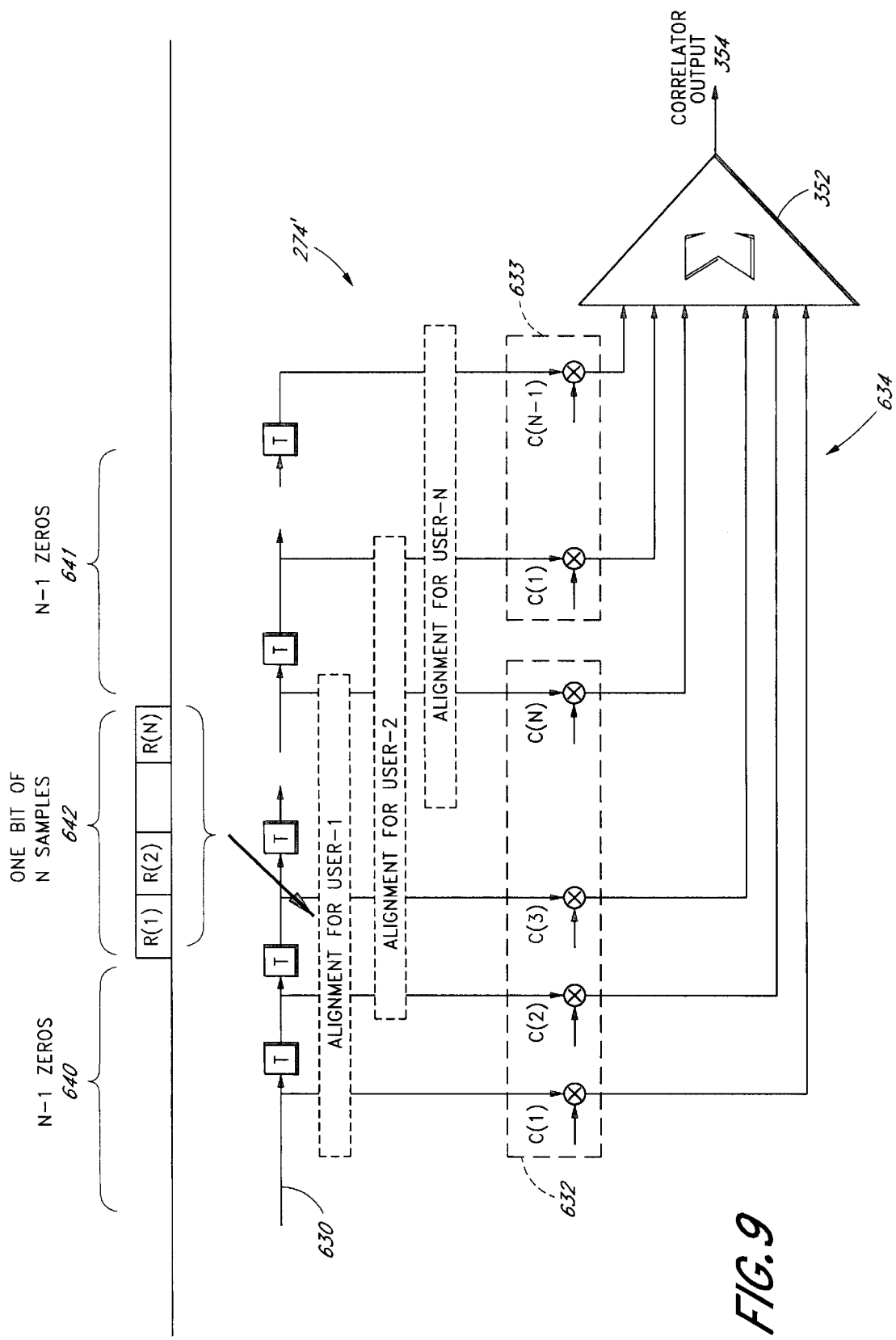

A cyclic correlation receiver 274' is shown in FIG. 9 and is the preferred embodiment of a portion of the baseband correlator 200 shown in FIG. 4. The correlator 274' includes a tapped delay line 630 which is clocked by the chip rale clock generator (204, FIG. 4a) to successively shift the received PSK modulated samples at the chip rate. Successive taps of the multipliers 632 (C(1) through C(N)) are respectively set to different values (+1 and −1) corresponding to the bits of the cyclic patterns with which the data bits of the VSAT stations have been modulo-2 summed, or spread by. The outputs 634 of the multipliers are summed by an adder 352 as the correlator output 354.

The cyclic correlation receiver 274' requires approximately two linear correlators, or equivalently, a linear correlator of nearly twice the length of the code sequence. Assuming bit synchronization, the receiver processing inserts N-1 zeros; 640 or 641 between each group of N chips 642 associated with a particular bit. The taps in the 2N-1 length correlator are set as follows. The first N taps 632 are set to the chips associated with the mother code sequence. The remaining N-1 taps 633 are set to the first N-1 chips of the mother code sequence. Once all signal samples have been loaded into the correlator 274', the first correlator output corresponds to the user assigned to the code representing a zero cyclic shift. At each additional shift through the correlator, the inserted zeros insure that the only taps operating on non-zero samples correspond to the chips in the code sequence associated with this shift. After N-1 shifts, each user has been despread. The next N-1 correlator outputs are ignored until the next information bit interval starts and now resides in the correlator 274'. In essence, the correlator requires flushing before the next set of samples associated with the next bit can be processed.

FIG. 10 details the operation of the cyclic correlation receiver 274' for the particular case of N=4. The correlator taps C(1) . . . C(4). 632' are a specific example of taps C(1) . . . C(N) 632 shown in FIG. 9. The received signal samples R(1) . . . R(4) 642' are an example of N samples 642 shown in FIG. 9. Each set of three zeroes 640' and 641' corresponds with the N-1 zeroes 640 and 641 shown in FIG. 9, respectively.

The group of four received samples 442', denoted {R(1) R(2) R(3) R(4)} and comprising one bit, are collected and the three zeros prepended 440' and appended 441' to this set of four samples. The correlator is set to {C(1) C(2) C(3) C(4) C(1) C(2) C(3)}. At the $0^{th}$ shift 650 of the correlator, {R(1) R(2) R(3) R(4)} are correlated (point-wise multiply and accumulate) with {C(1) C(2) C(3) C(4)}. Since the appended zeros 441' negate effects of {C(1) C(2) C(3)}, the information bits associated with the user (#1) assigned to the zero cyclic shift of the mother sequence are recovered. At the next shift 652, due to the inserted zeros, {R(1) R(2) R(3) R(4)} are correlated with {C(2) C(3) C(4) C(1)}. Since the latter represents one cyclic shift of the mother sequence, the information bits associated with this user (#2) are recovered. Continuing with another shift 654 results in the received samples {R(1) R(2) R(3) R(4)} being correlated with {C(3) C(4) C(1) C(2)}, another cyclic shift the mother sequence. Finally, on the fourth shift 656, the received samples {R(1) R(2) R(3) R(4)} are correlated with {C(4) C(1) C(2) C(3)}, the final cyclic shift in this example. At this point all of the four possible users will have had their bits, recovered. But since the correlator has length seven, the correlator must be flushed to return it to the proper starting point to recover the next bit from each of the users. This is accomplished by three shifts 658 of the correlator with the corresponding outputs ignored. During these last three shifts, new data samples are being loaded into the correlator.

For typical values of N, the hub complexity is substantially lower than synchronous CDMA. For example with N=31, spread slotted ALOHA requires one linear correlator, CCPMA requires a double length cyclic correlator and synchronous CDMA requires 31 correlators. Consequently, CCPMA is only slightly more complex than spread slotted ALOHA but has significantly lower levels of MAI. As compared to synchronous CDMA, the MAI levels are comparable but the complexity associated with CCPMA is dramatically reduced.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

While the present inventors have developed new communication waveform equations, it is to be understood that certain claims of this invention relate only to the application of these novel waveform equations to real world technological and industrial systems. Other uses of the new waveform equations, such as communications research and algorithm research form no part of the claimed waveform equations invention. Similarly, use of the new waveform equations in non-technological or non-industrial systems likewise form no part of the claimed waveform, equations invention.

What is claimed is:

1. In a satellite communications system, a synchronous satellite terminal (ST) for receiving outbound communication signals from a hub and for transmitting inbound communication signals to the hub, the ST comprising:
   a chip rate clock generator that recovers a bit timing clock signal received by the satellite terminal and generates a chip rate clock signal;
   a pseudo-noise (PN) code generator that receives the chip rate clock signal and a bit rate clock signal, and generates a cyclic shift inphase (I) PN code sequence and a cyclic shift quadrature (Q) PN code sequence;
   a differential encoder that differentially encodes data;
   a spreader that utilizes the I and Q PN code sequences to spread the encoded data; and
   a phase-shift keying modulator that receives the spread data and modulates a carrier with the spread data for transmission to the hub.

2. The ST defined in claim 1, wherein the Q PN code sequence is the reciprocal of the I PN code sequence.

3. The ST defined in claim 1, wherein the PN code generator is initialized by a channel assignment signal from the hub.

4. The ST defined in claim 1, wherein a control channel signal received from the hub provides timing adjustment information to adjust the phase of the chip rate clock.

5. The ST defined in claim 1, wherein the encoded data is demultiplexed into an inphase stream and a quadrature stream.

6. The ST defined in claim 5, wherein the spreader performs an exclusive-or (XOR) operation on the I PN code sequence and the inphase stream, and performs an XOR operation on the Q PN code sequence and the quadrature stream so as to form a spread Q stream.

7. The ST defined in claim 6, wherein the spread Q stream is delayed by a fraction of a chip period.

8. A satellite communications system, including a cyclic correlator for receiving an inbound communication signal from a plurality of satellite terminals, the inbound communication signal comprising a serial stream of spread spectrum symbols comprising:
   a delay line comprising 2N-1 storage elements, wherein N is a length in chips of a maximal length sequence code utilized for despreading the received symbols from the inbound communication signal;
   a set of 2N-1 multipliers receiving data from the delay line elements, wherein each delay line element feeds a corresponding multiplier, and wherein each multiplier has a tap and the taps of the multipliers are respectively set to different values (+1 and −1) corresponding to a cyclic pattern with which the symbols of the received communication signals from the satellite terminals have been spread; and
   an adder for summing the outputs of the multipliers thereby providing a set of data samples associated with symbols communicated from one of the satellite terminals.

9. The system defined in claim 8, wherein the cyclic correlator is utilized in a correlator module to despread the received communication signal in a baseband channel, the module comprising:
   a chip samples store and insert zeros module that buffers input baseband samples of the received communication signal and inserts a selected number of zeros prior to processing by the cyclic correlator processor;
   a chip delay module for receiving the channel's despread data samples from the cyclic correlator processor, wherein each communicated symbol is divided into two equal length sections, and delaying each data sample by N chips to time align the two sections of the symbol; and an adder that sums the time aligned sections of the symbol.

10. The system defined in claim 9, wherein the sections of each symbol are added, if the channel is an inphase channel, and one of the sections is subtracted from the other section of each symbol, if the channel is a quadrature channel.

11. The system defined in claim 9, wherein the correlator module is one of a plurality of correlator modules comprising a portion of a synchronous baseband correlator circuit for despreading an inphase pseudo-noise (PN) code and a quadrature PN code in a set of inphase and quadrature baseband channels that comprise the received communication signal, the baseband correlator additionally comprising:

at least one analog-to-digital converter for the inphase channel and the quadrature channel, the converter generating a plurality of samples per chip so as to produce inphase and quadrature digitized signals;

a chip matched filter (CMF) to improve a composite signal-to-noise ratio for each of the inphase and quadrature digitized signals; and a set of downsamplers to decimate the filtered signals down to a chip rate, wherein the quadrature channel is modulated with a one-half chip duration staggering relative to the inphase channel and the staggering is accounted for by clocking the quadrature code samples with an inverted chip rate clock, and wherein the output of each downsampler is fed to an associated one of the correlator modules.

12. A satellite communications system, comprising:

a hub; and a plurality of satellite terminals (STs), wherein each ST communicates with the hub using a bit synchronous, spread spectrum multiple access protocol, each ST assigned a unique code sequence cyclically related to the other code sequences, wherein the system utilizes a maximal length sequence (MLS) code of length N chips, and wherein a cyclic correlation function for the length N code results in N for a zero cyclic shift and −1 for each of the remaining N-1 shifts.

13. A satellite communications system, comprising:

a hub comprising a cyclic correlation receiver, the correlation receiver including a linear correlator of length 2N-1 chips; and a plurality of satellite terminals (STs), wherein each ST communicates with the hub using a bit synchronous, spread spectrum multiple access protocol, each ST assigned a unique code sequence cyclically related to the other code sequences, wherein the system utilizes a maximal length sequence (MLS) code of length N chips.

* * * * *